US011685657B2

(12) United States Patent
Star et al.

(10) Patent No.: US 11,685,657 B2
(45) Date of Patent: Jun. 27, 2023

(54) COVALENT ORGANIC FRAMEWORK PATTERNING ON SUBSTRATES

(71) Applicant: University of Pittsburgh—Of the Commonwealth System of Higher Education, Pittsburgh, PA (US)

(72) Inventors: Alexander Star, Pittsburgh, PA (US); David White, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 145 days.

(21) Appl. No.: 17/078,353

(22) Filed: Oct. 23, 2020

(65) Prior Publication Data

US 2021/0122638 A1    Apr. 29, 2021

Related U.S. Application Data

(60) Provisional application No. 62/925,553, filed on Oct. 24, 2019.

(51) Int. Cl.
| | |
|---|---|
| *C01B 32/194* | (2017.01) |
| *C09K 13/00* | (2006.01) |
| *B82Y 40/00* | (2011.01) |
| *B82Y 30/00* | (2011.01) |

(52) U.S. Cl.
CPC ............ *C01B 32/194* (2017.08); *C09K 13/00* (2013.01); *B82Y 30/00* (2013.01); *B82Y 40/00* (2013.01)

(58) Field of Classification Search
CPC ... C01B 32/194; C01B 32/182; C01B 32/184; C01B 32/186; C01B 32/188; C01B 32/19; C01B 32/192; C01B 32/196; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; C09K 13/00; B82Y 30/00; B82Y 40/00

See application file for complete search history.

(56) References Cited

U.S. PATENT DOCUMENTS

| | | | |
|---|---|---|---|
| 8,835,686 B2 | 9/2014 | Afzali-Ardakani | |
| 8,920,764 B2 | 12/2014 | Star | |
| 9,482,638 B2 | 11/2016 | Star | |
| 2012/0301953 A1* | 11/2012 | Duan | B82Y 30/00 977/734 |
| 2013/0315816 A1 | 11/2013 | Watson | |
| 2014/0037944 A1* | 2/2014 | Dichtel | B01J 20/324 428/411.1 |
| 2018/0142114 A1 | 5/2018 | Duan | |
| 2019/0022974 A1 | 1/2019 | Lin | |

OTHER PUBLICATIONS

White, et al., Holey Graphene Metal Nanocomposites via Crystalline Polymer Templated Etching, Nano Lett. 2019; 19: 2824-2831, with Supporting Information (Apr. 8, 2019) (Year: 2019).*

Ding, et al., Transfer patterning of large-area graphene via holographic lithography and plasma etching, J. Vac. Sci. Technol. B 2013; 32: 06FF01-1 to 06FF01-7 (Year: 2013).*

Glossary of Terms in Nanotechnology, accessed online at https://www.iinano.org/glossary/ on Feb. 9, 2023 (Year: 2023).*

Lohse, M.S., and Bein, T, Covalent Organic Frameworks: Structures, Synthesis, and Applications, Advanced Functional Materials, 28, 1705553 (2018), pp. 1-71.

White, David L. et al; Holey Graphene Metal Nanoparticle Composites via Crystalline Polymer Templated Etching; Nano Lett, Apr. 8, 2019, 1-8.

Moreno, C.; Vilas-Varela, M.; Kretz, B.; Garcia-Lekue, A.; Costache, M. V.; Paradinas, M.; Panighel, M.; Ceballos, G.; Valenzuela, S. O.; Pena, D.; Mugarza, A., Bottom-up synthesis of multifunctional nanoporous graphene Science 2018, 360, 199-203.

Zhao, X.; Hayner, C. M.; Kung, M C.; Kung, H. H., Flexible Holey Graphene Paper Electrodes with Enhanced Rate Capability for Energy Storage Applications. ACS Nano 2011, 5, No. 11, 8739-8749.

Han, X.; Funk, M. R.; Shen, F.; Chen, Y.-C.; Li, Y.; Campbell, C. J.; Dai, J.; Yang, X.; Kim, J.-W.; Liao, Y.; Connell, J. W.; Barone, V.; Chen, Z.; Lin, Y.; Hu, L., Scalable Holey Graphene Synthesis and Dense Electrode Fabrication toward High-Performance Ultracapacitors. ACS Nano 2014, 8, 8255-8265.

Xu, Y.; Chen, C. Y.; Zhao, Z; Lin, Z.; Lee, C.; Xu, X.; Wang, C.; Huang, Y.; Shakir, M. I.; Duan, X., Solution Processable Holey Graphene Oxide and Its Derived Macrostructures for High-Performance Supercapacitors. Nano. Lett. 2015, 15, 4605-4610.

Yang, Y.; Yang, X.; Zou, X.; Wu, S.; Wan, D.; Cao, A.; Liao, L.; Yuan, Q.; Duan, X. Ultrafine Graphene Nanomesh with Large On/Off Ratio for High-Performance Flexible Biosensors. Adv. Func. Mater. 2017, 27, 1604096.

Paul, R. K.; Badhulika, S.; Saucedo, N. M.; Mulchandani, A., Graphene Nanomesh as Highly Sensitive Chemiresistor Gas Sensor. Anal. Chem. 2012, 84, 8171-8178.

Liang, X.; Jung, Y.-S.; Wu, S.; Ismach, A.; Olynick, D. L.; Cabrini, S.; Bokor, J., Formation of Bandgap and Subbands in Graphene Nanomeshes with Sub-10 nm Ribbon Width Fabricated via Nanoimprint Lithography. Nano. Lett. 2010, 10, 2454 2460, pp. 1-9.

(Continued)

*Primary Examiner* — Daniel C. McCracken

(74) *Attorney, Agent, or Firm* — Bartony & Associates LLC

(57) ABSTRACT

A method of forming a pattern in a substrate material includes positioning a layer of a covalent organic framework polymer including nanoscale holes or pores therein over the substrate material as a template having nanoscale holes or pores therein to form a templated assembly and applying an etching process to the templated assembly.

22 Claims, 13 Drawing Sheets

(56) References Cited

OTHER PUBLICATIONS

Lin, Yi et al., Bulk preparation of holey graphene via controlled catalytic oxidation; Nanoscale, 2013, 5, 7814-7824.

Wang, Min et al., CVD Growth of Large Area Smooth-edged Graphene Nanomesh by Nanosphere Lithography; Scientific Reports; 3 : 1238; DOI: 10.1038/srep01238; 2013; 1-6.

Zeng, Zhiyuan et al.; Fabrication of Graphene Nanomesh by Using an Anodic Aluminum Oxide Membrane as a Template; Adv. Mater. 2012, 24, 4138-4142.

Lokhande, A. C. et al.; Holey graphene: an emerging versatile material; J. Mater. Chem. A, 2020, 8, 918-977.

Gethers, M. L. et al.; Holey Graphene as a Weed Barrier for Molecules; ACS Nano, 2015, vol. 9, No. 11, 10909-10915.

Spitler, Eric L. et al.; Lattice Expansion of Highly Oriented 2D Phthalocyanine Covalent Organic Framework Films; Angew. Chem. 2012, 124, 2677-2681.

Gou, Xianhua et al.; Preparation and engineering of oriented 2D covalent organic framework thin films; RSC Adv., 2016, 6, 39198-39203.

\* cited by examiner

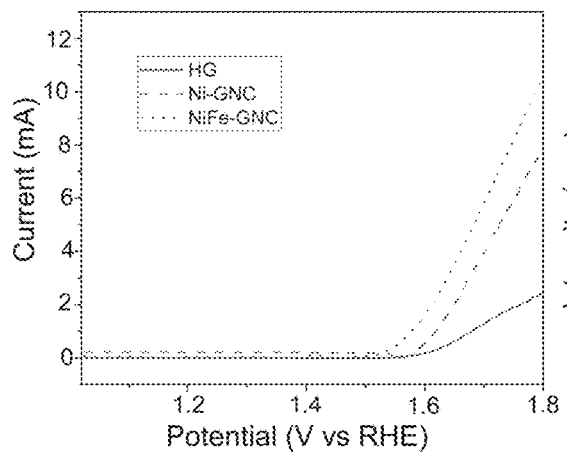
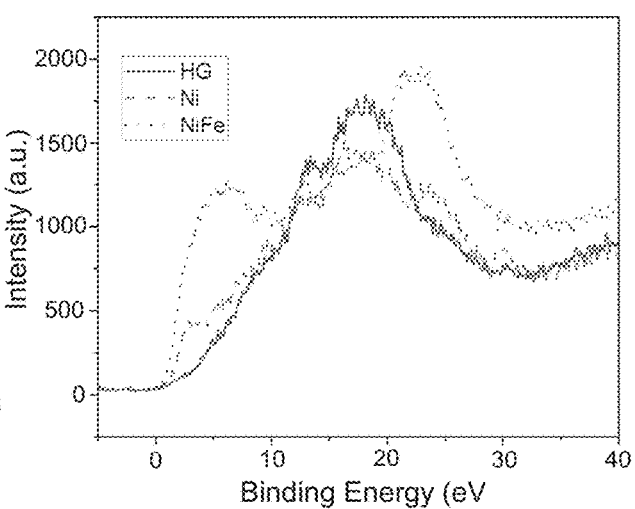
Fig. 12A     Fig. 12B
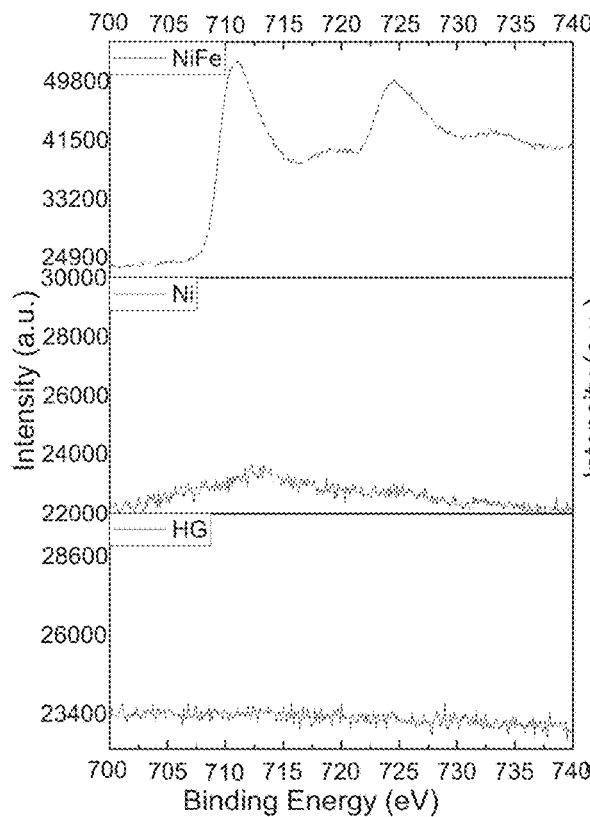
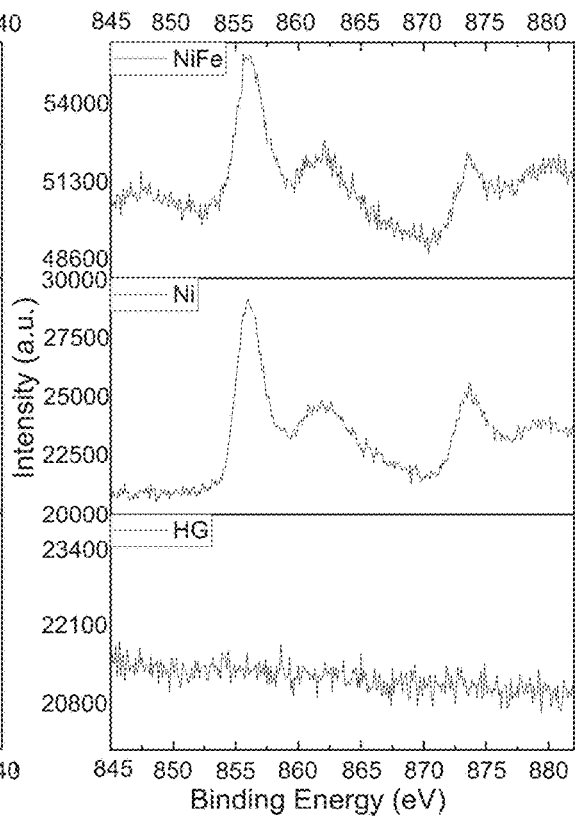
Fig. 12C     Fig. 12D

COVALENT ORGANIC FRAMEWORK PATTERNING ON SUBSTRATES

CROSS-REFERENCE TO RELATED APPLICATIONS

This application claims benefit of U.S. Provisional Patent Application Ser. No. 62/925,553, filed Oct. 24, 2019, the disclosure of which is incorporated herein by reference.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

Graphene has sparked enormous research interest since its isolation in 2004. There has also been an interest in developing graphene composite materials that leverage graphene's extraordinary physical properties in new technologies through functionalization of graphene. Oxidative analogues of graphene such as graphene oxide and reduced graphene oxide retain many of the same properties of graphene. However, while these materials include many functional moieties, defect formation through current oxidation methods is random. Even with reductive treatments, such materials never fully recover the electrical properties of the starting material.

Holey graphene structures have been pursued for use in electronic devices to modulate graphene's semi-metallic band structure through quantum confinement. The three primary routes towards producing such structures are further oxidation of graphene oxide type structures, traditional lithographic processes, or bottom-up organic synthesis. Further chemical or biological oxidation of graphene oxide structures lacks control over size and placement of holes generated. Traditional lithography allows for control over size and placement of holes but often lacks the necessary resolution to access significant band modulation that occurs at sub-5 nm neck widths. While bottom-up syntheses may generate well defined structures with appropriate dimensions to access properties induced by dimensional reduction, the syntheses are generally not scalable to large areas.

SUMMARY

In one aspect, a method of forming a pattern in a substrate material includes positioning a layer of a covalent organic framework (COF) polymer including nanoscale pores therein over the substrate material as a template (having nanoscale pores/holes therein) to form a templated assembly and applying an etching process to the templated assembly.

In a number of embodiments, the etching process is an oxidative etching process. The etching process may, for example, be a chemical oxidation process, an electrochemical oxidation process, a plasma process, or a photochemical reaction. In a number of embodiments, the method further includes removing any remaining covalent organic framework polymer after applying the oxidative etching process.

In a number of embodiments, the layer of covalent organic framework polymer is positioned on the substrate material under a pressure suitable to orient the covalent organic framework polymer relative to the surface of the substrate material such that the pores of the covalent organic framework polymer align generally perpendicular or normal (that is, normal or withing 10% of normal) to the surface of the substrate.

In a number of embodiments, the substrate material is a graphitic material and a pattern in the graphitic material resulting from the etching process includes holes through the graphitic material. The graphitic material may, for example, be a multilayer graphite or a graphene. In a number of embodiments, the graphitic material is a multilayer graphite. The method may, for example, further include a separation of layers of holey graphene after removing the remaining covalent organic framework polymer (to, for example, provide holey graphene). In a number of embodiments, a multilayer graphite used in the methods hereof may, for example, include a highly ordered pyrolytic graphite.

The method may, for example, further include depositing nanoparticles of at least one of a metal or a metal compound in a pattern in the substrate material resulting from the etching process. The metal may, for example, be selected from the group consisting of gold, palladium, nickel, copper, cobalt, platinum, iron, silver, rhodium, iridium, and combinations thereof. In a number of embodiments, depositing the nanoparticles of at least one of the metal or the metal compound includes contacting the substrate material with a solution including a salt of the metal or a metal oxide, electrodeposition, chemical reduction, or vapor deposition. The metal compound may, for example, be an oxide, a chloride, or a hydroxide.

In a number of embodiments, the substrate material includes graphene, a pattern in the graphene resulting from the etching process includes holes through the graphene to form holey graphene, and the method further includes depositing nanoparticles of the metal or the metal compound in the holes of the holey graphene. As described above, the metal may, for example, be selected from the group consisting of gold, palladium, nickel, copper, cobalt, platinum, iron, silver, rhodium, iridium, and combinations thereof. As also described above, depositing nanoparticles of at least one of the metal or the metal compound may, for example, include contacting the holey graphene with a solution including a salt of the metal or a metal oxide, electrodeposition, chemical reduction, or vapor deposition. The metal compound may, for example, be an oxide, a chloride, or a hydroxide. A plurality metals or metal compounds may, for example, be deposited in the pattern in the substrate material resulting from the etching process.

In a number of embodiments, the covalent organic framework polymer is COF-5, COF-1, CTF-1, TpPa-1, TPE-Ph COF, HPB COF, ZnPc-PPE COF, or HHTP-DPB COF. Many COF polymers are suitable for use herein. COF polymers are reviewed in, for example, Lohse, M. S., and Bein, T, Covalent Organic Frameworks: Structures, Synthesis, and Applications, Advanced Functional Materials, 28, 1705553 (2018), the disclosure of which is incorporated herein.

As used herein, the term "nanoscale" refers to dimensional range in the order of nanometers (for example, a dimensional range of approximately 0.5 to 100 nanometers). In a number of embodiments, the average pore size of the covalent organic framework polymer may, for example, be in the range of 0.5 nm to 5.0 nm or 0.7 nm to 4.7 nm. The average neck width of the covalent organic framework polymer may, for example, be no greater than 5 nm.

In another aspect, a composition includes a layer of a covalent organic framework polymer including nanoscale pores therein over a substrate material, different from the COF. In a number of embodiments, the substrate material includes a graphitic material. The composition can be further characterized as described above and elsewhere herein.

In another aspect, a composition includes a substrate material including an etched pattern formed by the process of positioning a layer of a covalent organic framework polymer comprising nanoscale pores therein over the substrate material as a template having nanoscale pores therein to form a templated assembly, and applying an etching process to the templated assembly to form the etched pattern in the substrate material.

In one aspect, a method of forming a pattern in a graphitic substrate material includes etching holes in the graphitic material in the pattern. As described above, the method may, for example, include positioning a layer of a material such as a covalent organic framework (COF) polymer including nanoscale pores therein over the graphitic substrate material as a template (having nanoscale pores/holes therein) to form a templated assembly and applying an etching process to the templated assembly.

In another aspect, composition includes a substrate material including an etched pattern formed by the methods hereof (as, for example, set forth above).

The present systems, methods and compositions, along with the attributes and attendant advantages thereof, will best be appreciated and understood in view of the following detailed description taken in conjunction with the accompanying drawings.

illustrates a silver composite; panel (b) illustrates a gold composite; panel (c) illustrates a copper composite; and panel (d) illustrates a nickel composite.

Figure 11:
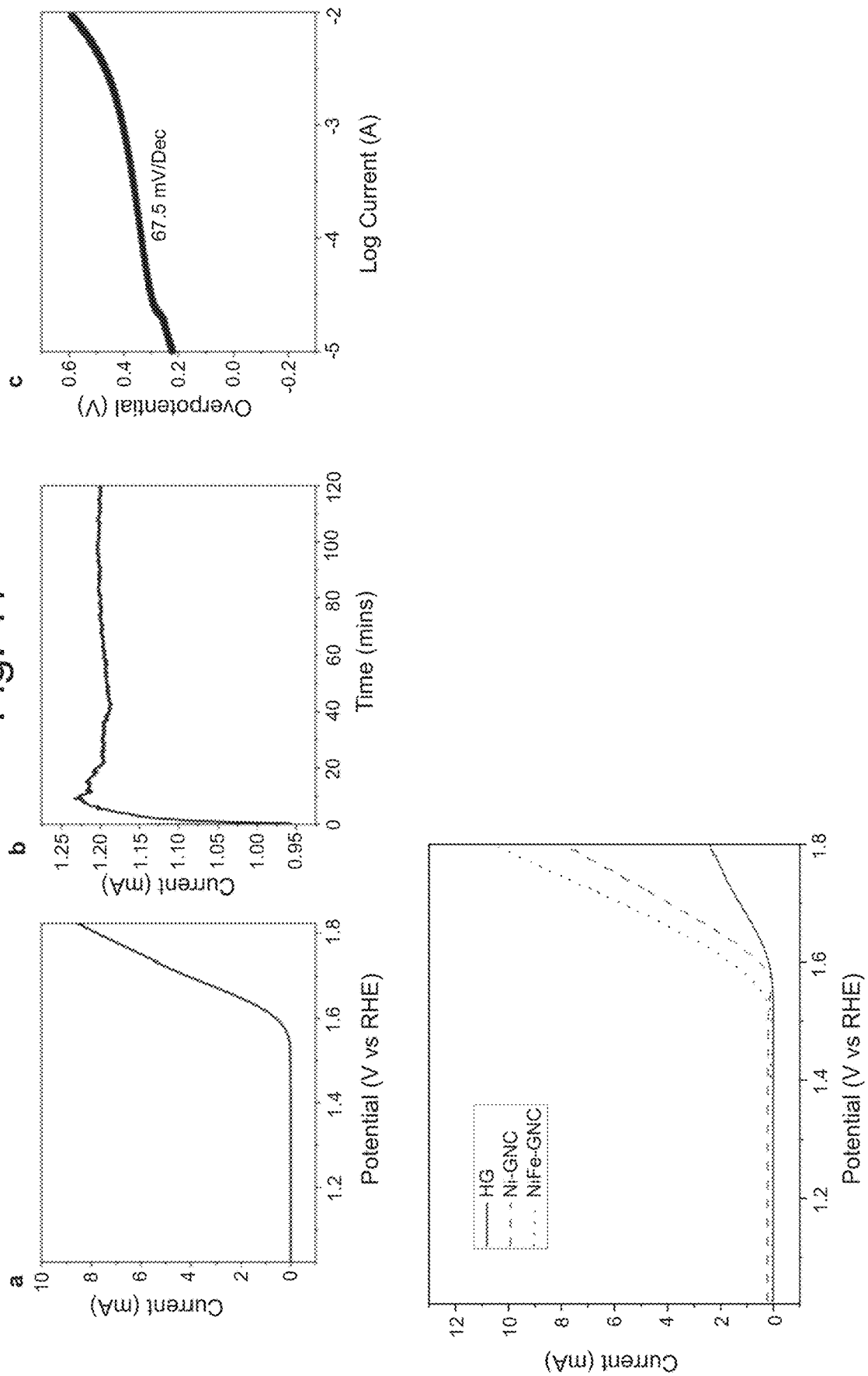

FIG. 11 illustrates electrochemical catalytic data for Ni-graphene nanoparticle compound (GNC) toward oxygen evolution reaction (OER) wherein panel (a) illustrates a linear sweep voltammogram (LSV) in 1 M KOH on a rotating disk electrode at 1600 rpm, panel (b) illustrates galvanostatic electrolysis of Ni-GNCs for 2 hours of continuous operation under the same conditions as LSV, and panel (c) illustrates a Tafel plot of (a) where the central region of the plot has been fitted.

FIG. 12A illustrates a linear sweep voltammetry study in 1M KOH for oxygen evolution reaction (OER) catalysis for Hg, Ni and NiFe GNC composite materials demonstrating an improved onset potential for the multi-metallic GNC composite (NiFe) over the single metal (Ni).

FIG. 12B illustrates a valence XPS study for the GNC composite materials of FIG. 12A.

FIG. 12C illustrates an iron XPS study of the GNC composite materials of FIG. 12A wherein $Fe_2O_3$ was found to be the primarily observed species in the multi-metal GNC composite material.

FIG. 12D illustrates a nickel XPS study for the GNC composite materials of FIG. 12A wherein $Ni(OH)_2$ was found to be the primary species in both the metal and multi-metal GNC composites materials.

DETAILED DESCRIPTION

It will be readily understood that the components of the embodiments, as generally described and illustrated in the figures herein, may be arranged and designed in a wide variety of different configurations in addition to the described representative embodiments. Thus, the following more detailed description of the representative embodiments, as illustrated in the figures, is not intended to limit the scope of the embodiments, as claimed, but is merely illustrative of representative embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "a layer" includes a plurality of such layers and equivalents thereof known to those skilled in the art, and so forth, and reference to "the layer" is a reference to one or more such layers and equivalents thereof known to those skilled in the art, and so forth. Recitation of ranges of values herein are merely intended to serve as a shorthand method of referring individually to each separate value falling within the range. Unless otherwise indicated herein, and each separate value, as well as intermediate ranges, are incorporated into the specification as if individually recited herein. All methods described herein can be performed in any suitable order unless otherwise indicated herein or otherwise clearly contraindicated by the text.

Covalent organic frameworks (COFs) are two-dimensional and three-dimensional, porous/microporous, crystalline polymeric solids having extended structures in which low molecular weight "building blocks" are covalently linked through strong covalent bonds. In that regard, COFs are typically made entirely from light elements (for example, H, B, C, N and P) that form strong covalent bonds. COFs have been developed for many applications including gas storage, organic electronics, capacitors, and catalytic applications. COFs have not previously been used in physical templating of substrate materials. The crystalline structure of the COF polymers can be predicted in advance and provides an avenue to bridge traditional photolithography with rational chemical synthesis.

Figure 1A:
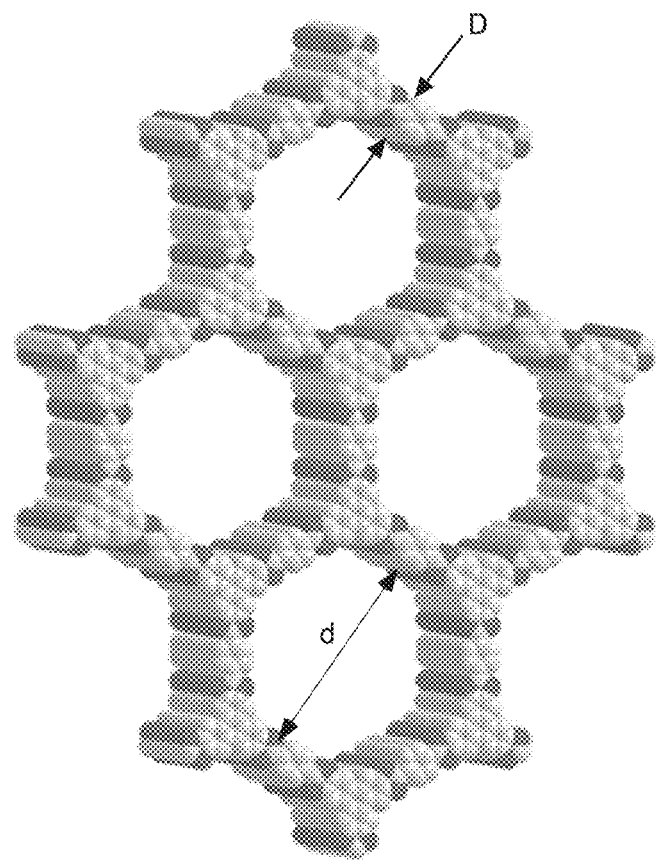
FIG. 1A illustrates an idealized representation of average neck width (D) and average hole/pore size or diameter (d) formed in a substrate.

As used herein, the term covalent organic framework or COF thus refers to a two-dimensional porous crystalline (that is, exhibiting translational symmetry) polymers constructed from reticular building units and having defined pore size, neck width, and pore shape. Chemistries for linking together building units include, for example, boronate ester (COF-5), boroxine (COF-1), triazine (CTF-1), and β ketoenamine (TpPa-1) linkages. In general, pores of COF polymer may take hexagonal (for example, COF-5), Kagome lattice (for example, TPE-Ph COF), triangular (for example, HPB COF), and square shapes (for example, ZnPc-PPE COF). Pore sizes (see d of FIG. 1A) of COF polymer may, for example, range from 0.7 nm (for example, COF-1) to 4.7 nm (for example, HHTP-DPB COF). Neck widths (see D of FIG. 1A) are determined both from etching conditions as well as the width of individual building blocks (for example, the width of benzene to pyrene including hydrogens). In a number of embodiments, neck widths of patterned substrates materials hereof are 5 nm or less. Representative COF polymers for use herein exhibit a preference for eclipsed stacking between individual 2-D layers of the COF polymer, which allows accessibility for reactants to pattern the underlying substrate.

In general, there are two classes of behavior via which pores of a COF polymer may orient normal to the surface of the underlying substrate. In that regard, either the pores will orient normal to the surface of the substrate without epitaxial matching based on interactions with complementary pi-pi stacking (graphene) or pre-synthesized COF polymers can be oriented under uniaxial pressure to form films with oriented pores on arbitrary substrates.

In a number of representative embodiments hereof, a materials such as a COF polymer having nanoscale pores therein is positioned over or deposited on a substrate material as a template to form a templated assembly. An etching process (for example, an oxidative etching process such as reactive ion etching or RIE) is applied to templated assembly to etch a pattern into the substrate material. In a number of embodiments, the etching process is applied for sufficient time to form holes within the substrate material. In a number of representative embodiments described herein, the substrate material is a graphitic material. Graphitic materials are carbonaceous materials including $sp^2$ hybridized carbon bonds. Graphitic materials suitable for use herein include, for example, graphite, graphene, graphene oxide, graphite oxide, reduced graphene oxide, and reduced graphite oxide. Other substrate materials that can be used in the systems, methods and compositions hereof include, but are not limited, silicon, alumina, and indium doped tin oxide. The substrate materials may be formed as nanostructures such as nanotubes (including, for example, carbon and other nanotubes). In general, any material capable of being patterned by an etching process may be used as a substrate material to create nanometer-scale patterns therein. Depending upon the substrate and the nature, conditions and timing or duration the etching process, and the created templated, etched patterns may pass through the substrate material (creating holes or passages therein) and/or pass only partially therethrough.

Graphene composite materials are useful for many applications ranging from chemical sensing to catalysis. While pristine graphene has been demonstrated to be an excellent material for the aforementioned applications, there are limitations imposed by the nature of the material. The lack of functional groups, while enabling extraordinary conductivity, makes composite material manufacture more difficult. The primary difficulty in introducing functional groups is the destruction of the $sp^2$ network. For applications where, composite materials would benefit from graphene's extraordinary conductivity, oxidative processes to introduce chemical handles or functionalities are problematic. The ability to introduce a high density of oxidative moieties while retaining the underlying graphene conductivity represents a useful advance in graphene composite materials. Oxidative moieties can, for example, act as reduction sites for metal ions to form metal nanoparticles. Patterning of such oxidative sites in the system, methods and compositions hereof may, for example, provide for high-density, size-controlled nanoparticles that are electronically coupled through graphene which exhibits, for example, Raman enhancement and chemiresistive gas sensing applications.

COF polymers such as COF-5, which may orient with respect to graphene, were used in a number of representative studies hereof. Such representative COF-5 polymers exhibited a pore size of approximately 2.7 nm. In a number of representative embodiments, COF-5 polymers were used herein to provide high-density, controlled patterning of graphene, which has utility for many uses. In a number of representative embodiments, patterned graphenes hereof were used to produce unique composites which retain the outstanding electrical properties of graphene.

The systems, methods and compositions hereof provide a significant advancement in the art through used a combination of a bottom-up synthesis of 2-D covalent organic frameworks onto a substrate material such as graphene and a top down process of etching/oxidative etching (for example, via reactive ion etching or RIE) to affect the underlying substrate material (for example, graphene) structure. In the furtherance of bridging an existing divide for composite graphitic materials, in a number of embodiments, the methodologies hereof uses 2-D covalent organic frameworks or COFs as templates for hole formation in graphitic material/graphene through, for example, plasma etching. The formed holes may, for example, act as edge-only chemical handles while enabling retention of a contiguous $sp^2$ structure. Holey graphene structures generated in representative studies hereof may function, for example, as auto-reduction sites for small metallic nanoparticles (for example, catalytic metallic nanoparticles). Representative examples of composite materials hereof exhibited $10^3$ enhancement of the Raman signal of the underlying holey graphene as well as excellent calculated limits of detection in gas sensing of, for example, $H_2S$ (3 ppb) and $H_2$ (10 ppm).

The edge-functionalized holey graphene (and other graphitic materials hereof) retain many of original electrical properties of the pre-patterned material and may be used in a number of devices systems and methods without further functionalization. Nonetheless, such materials may readily be used in forming many different types of functional composites. Likewise, many other materials or substrate materials may be used in the COF-patterning methodologies hereof.

Figure 1B:
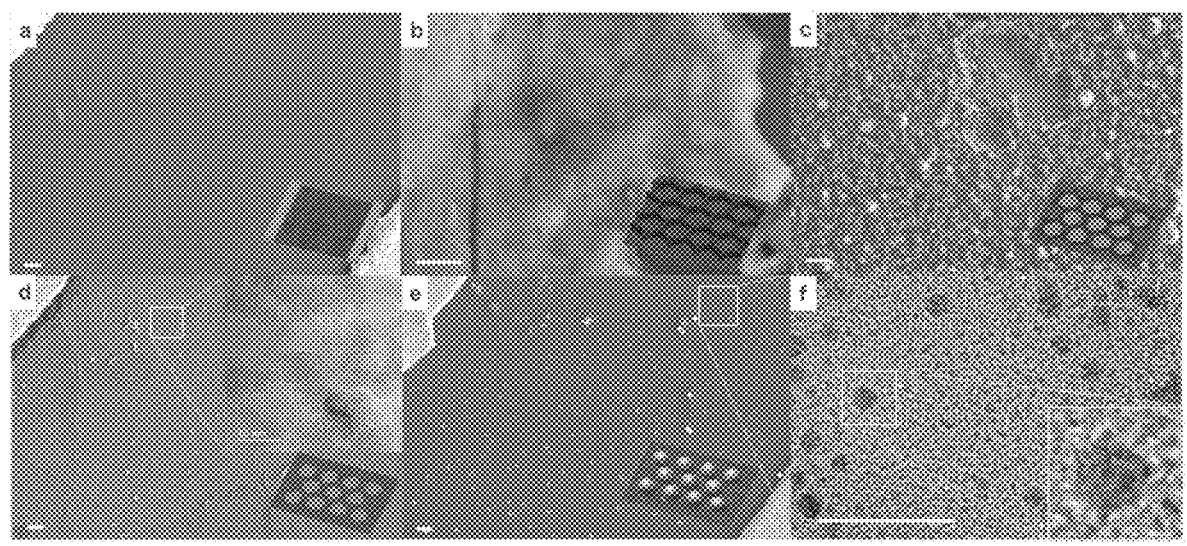
FIG. 1B illustrates electron micrographs tracking physical differences in graphene across a COF-5 templating process wherein: panel (a) shows transferred graphene on a silicon or Si chip with interdigitated gold electrodes; panel (b) shows COF-5 growth on the graphene chip; panel (c) shows that oxidative reactive ion etching (RIE) etches COF-5 and graphene; panel (d) shows removal of most of the COF-5 via an ethanol wash to reveal patterned graphene, and the inset shows a high resolution TEM micrograph demonstrating adjacent hole formation from COF patterning; panel (e) shows generation of gold metal nanoparticles at oxidized hole sites via soaking in a 1 mM HAuCl$_4$ solution; and panel (0 illustrates a high resolution TEM micrograph showing nanoparticle formation corresponding to patterned holes, wherein the inset shows distance between highlighted lines is consistent with a lattice spacing of 0.204 nm indicating a gold (200) lattice plane, and wherein all SEM scale bars are 200 nm and the HRTEM scale bar in panel (f) is 20 nm.

In a number of studies hereof, changes in physical characteristics of graphene were tracked through a combination of scanning electron microscopy or SEM and high resolution transmission electron microscopy or HRTEM (see FIG. 1B). In a number of representative studies, graphene was grown via an atmospheric chemical vapor deposition (APCVD) process and transferred from a copper foil substrate to a prefabricated silicon chip. Transfer occurred without polymer support to ensure intimate contact between the COF-5 and graphene as well to eliminate a subsequent step to remove polymer support residues. Graphene was observed via SEM being draped between two electrodes approximately 6 µm apart (panel (a) of FIG. 1B). Minimal wrinkles and no holes or defects were observed, confirming that the transfer process preserves the integrity of the graphene.

COF-5 was synthesized via a modified solvothermal process and oriented its pores generally normal to the graphene substrates. The resultant COF-5 layer was approximately as thick as the electrodes, which were 65 nm thick. Previous study of the synthesis indicate that platelet formation for COF-5 are 7 nm thick. We observed multiple layers of COF-5 on top of the graphene (panel (b) of FIG. 1B). COF-5 thickness measured via atomic force microscopy of AFM demonstrated that the modified procedure on the prefabricated chip produced a minimum of 25 nm of COF-5 growth after 30 minutes of reaction time as compared to the observed ~65 nm of growth from 40 minutes of reaction time. While it has been reported that the ideal c-stacking arrangement of COF-5 is not perfectly eclipsed but slightly staggered, this does not affect the described process because the layers of COF-5 closest to the graphene determine the patterning profile. Further high-resolution TEM micrographs, powder X-ray diffraction (PXRD), and Fourier-transform infrared spectroscopy (FTIR) results matched early timepoint formation of crystalline COF-5.

In a number of representative studies hereof, RIE, which utilizes oxygen plasma and a voltage bias, was used to anisotropically etch through both the polymer and graphene. RIE promotes formation of dense hole patterning in the polymer (see panel (c) of FIG. 1B) and changes in the electrical properties of graphene. RIE processing without the polymer destroys the graphene completely. Conditions to achieve regular patterning and changes in electrical characteristics were empirically optimized.

Etching (for example, RIE) optimization was performed as a function of the COF polymer used, COF thickness, substrate being etched, and a desired etch depth. In the case of graphene, the optimization was primarily performed with respect to retention of electronic performance while ensuring dense patterning.

The COF can be envisioned as both providing the initial template for the hole formation as well as acting as a temporary stop against overoxidation by protecting reactive sites formed in the initial oxidation. Larger white formations embedded within the etched polymer were attributed to homogeneous phase growth of COF-5 that was included in the film during the COF growth process. Such formations were randomly oriented with respect to the surface of graphene and therefore lack distinct holes. COF-5 remains after etching as evidenced by SEM (panel (c) of FIG. 1B) and may, for example, be removed through a solvent/ethanol wash.

The underlying graphene displays dense patterning on SEM and TEM (see panel (d) of FIG. 1B and the inset thereof). Residual COF-5 persisted in the study represented by the image but was ultimately removed in a subsequent metal salt soak (described further below) as a result of longer exposure to aqueous conditions. Overall structural continuity of the graphene remained intact and the COF-5 templating process was conformal with respect to wrinkles therein. Across the relatively large area of the spacing between the electrodes, some areas experienced more extensive oxidation. More extensive oxidation may, for example, be attributed to the unevenness in the thickness of the COF-5 wherein thinner areas experience more intensive etching as compared to relatively thick areas. The inset of panel (d) shows several adjacent holes with dimensions marginally larger than COF-5. Uneven etching across areas on prefabricated chip devices may, at least partially, be attributable to height changes caused by the presence of gold electrodes affecting the quality of the COF grown. When the patterning process was conducted on bare silicon wafer, AFM across micron-sized areas demonstrated relatively consistent patterning.

Figure 2:
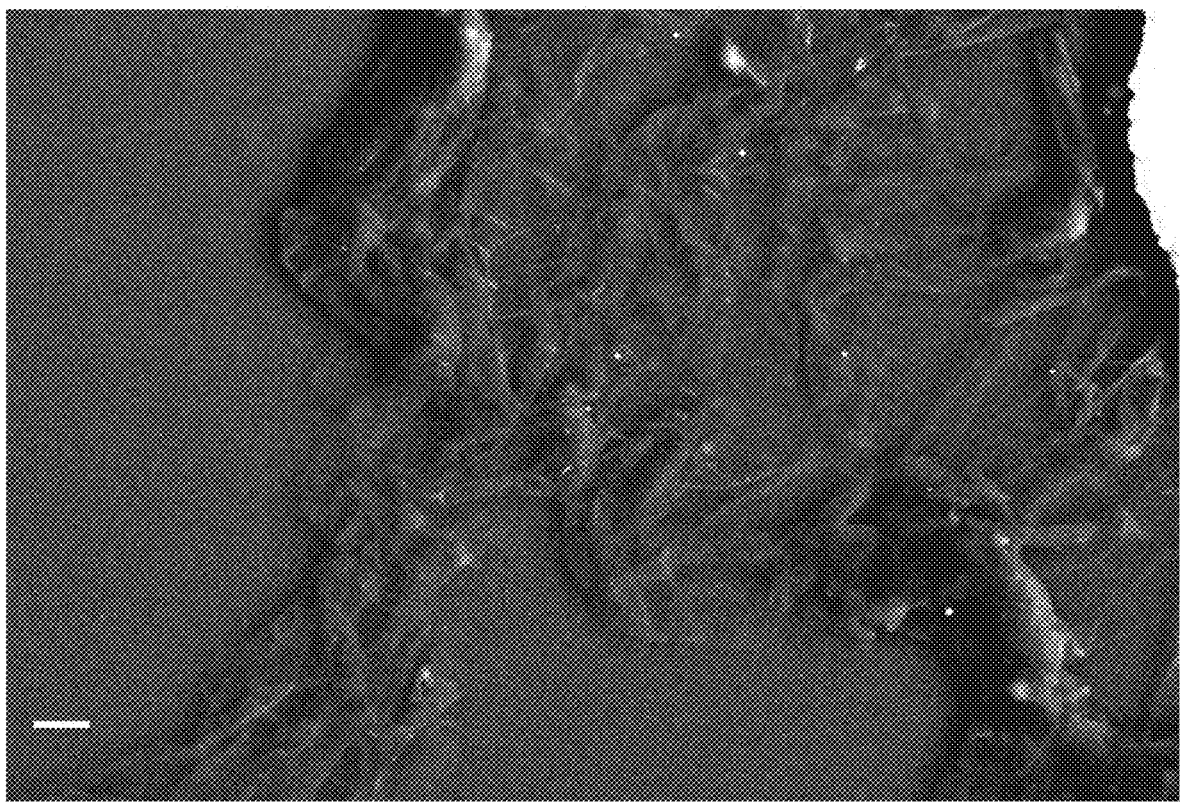
FIG. 2 illustrates an SEM micrograph of as-transferred graphene soaked in gold solution.

In a number of studies, COF-5 templated holey graphene structures were soaked in 1 mM noble metal solutions for two hours in a dark environment to promote nanoparticle growth at the reactive hole sites. Both gold and palladium solutions yielded templated nanoparticle growth. Auto-reduction has been previously reported for gold at higher concentrations on graphene oxide composites. A significant distinction between such graphene oxide and the material hereof is that the oxidative hole formation is templated and provides a confining environment. This aspect is illustrated by control experiments utilizing as-transferred graphene without any patterning exposed to the gold metal soak (see FIG. 2). While the as-grown graphene was intact as confirmed by Raman spectroscopy, it is known that CVD graphene will have defects over larger area growth without special synthetic consideration. Additionally, the transfer process provides an opportunity to damage the graphene or introduce wrinkling. The primary sites of formation are on edges, wrinkles, and defects. COF-5 based plasma patterning introduces more edge sites which act as nucleation sites for nanoparticle growth. Further control experiments with growth and removal of COF without RIE demonstrated that COF impurities lack the ability to seed appreciable gold nanoparticle growth.

In a number of studies, two types of nanoparticle growth were observed based, for example, upon TEM observations. In that regard, larger (40.1±10.3 nm, n=57) and smaller (3.27±0.81 nm, n=61) nanoparticles were observed via TEM. Without limitation to any mechanism, a greater degree of oxidation may contribute to the formation of larger nanoparticles by providing larger holes for nanoparticle formation. Overgrowth of individual small nanoparticles into larger nanoparticles was also observed in high-resolution TEM (HRTEM) images and contributed to multiple size distributions of nanoparticles. In areas where only the initial templated holes formed, only small nanoparticles were produced. Energy dispersive X-ray analysis (EDAX) data collected during SEM confirmed the identity of the nanoparticles as gold. Large area-to-area variation showed different distributions of nanoparticle growth. Some areas were only populated by smaller nanoparticle growth (panel (e) of FIG. 1B) while others were populated by both smaller and larger nanoparticle growth.

Additional AFM images were taken on the post gold metal soak condition to understand the extent of gold nanoparticle formation and to confirm high patterning density. Extensive minor height deviations were attributed to hole formation while large increases in height were assigned to gold nanoparticle formation. The lack of total coverage by gold nanoparticle formation on the small scale of AFM images indicated that the concentrations used did not promote complete gold nanoparticle formation across the entire patterned graphene sheet. Higher concentrations were avoided to mitigate such overgrowth. Optimal concentration and other conditions for metal or metal oxide growth are readily determined for particular systems and uses thereof. The high-resolution images confirmed the successful patterning of the underlying graphene by COF-5 based plasma etching.

Further AFM imaging conducted on bare silicon wafer (as opposed to prefabricated chips) in the post-gold-metal-soak condition demonstrated consistent patterning as well as gold nanoparticle formation. An excess of micron-sized areas of both holes and gold nanoparticles were observed filling the patterned graphene. Magnified images revealed only partial filling in of the gold nanoparticles in formed holes. Medium range patterning of the substrate materials hereof indicates the possibility of COF-based templates as a viable patterning strategy for achieving few nanometer sized features across micron areas. In a number of representative embodiments, patterning may, for example, be achieved in which pore size ranges from approximately 0.7 nm to approximately 4.7 nm.

Figure 3:
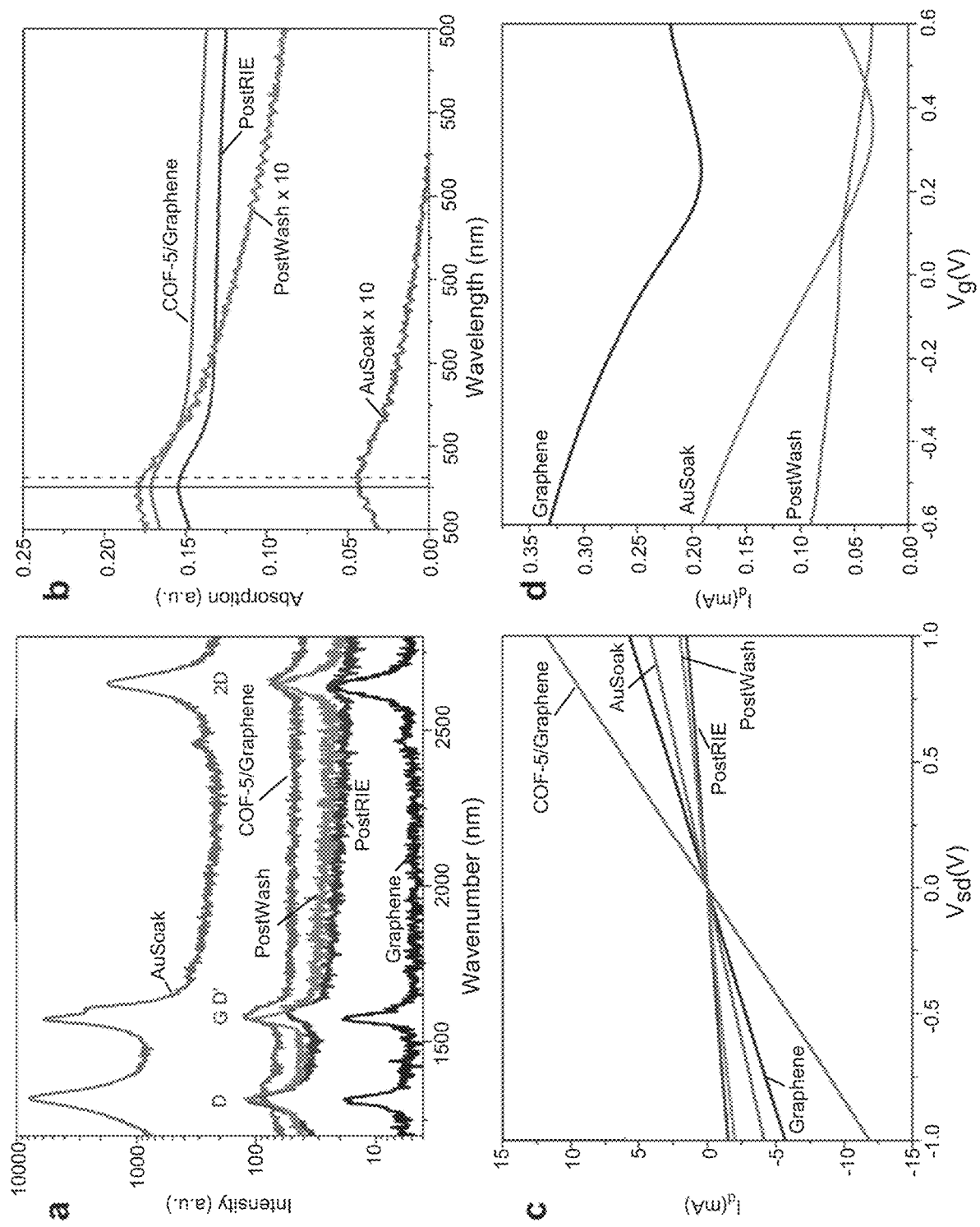
FIG. 3 illustrates optical and electrical measurements throughout the COF-5 templating process wherein: panel (a) shows Raman spectroscopy tracking changes during patterning, wherein intensity is plotted in log scale to capture the large increase in signal following gold soaking as a result of Raman enhancement; panel (b) show UV-Vis tracking of changes from COF-5 growth, wherein the solid and dashed vertical lines indicate $\lambda_{max}$ before and after gold soaking respectively, and the signal of both post wash and gold soaking have been multiplied by ten to enable more direct comparison; panel (c) shows current-voltage characteristics measurements throughout the process; and panel (d) illustrates liquid gated FET (vs 1 M Ag/AgCl) measurements of the structure at select time points.

Raman spectroscopy (panel (a) of FIG. 3) was used as a technique to track the changes in the structural characteristics of graphene during patterning. The initial Raman signal contains the signature D, G, and 2D peaks at 1350, 1570, and 2690 $cm^{-1}$, respectively. The D peak in the initial spectrum is ascribed to the transfer process because the spectrum of the graphene on the copper foil has no appreciable D peak. After COF-5 is grown on top of the graphene, the Raman signal changes showing signal dominated by characteristic COF-5 peaks with a large decrease in the relative 2D peak intensity. Oxygen plasma etching resulted in a general decrease in signal accompanied by an increase in the D region of the spectra. Washing with ethanol revealed a large increase in the 2D intensity signifying that the underlying graphene was being probed, which indicated the removal of the overlying COF. Gold soaking induced three orders of magnitude increase in the signal of all three peaks as well as revealing an indictive shoulder peak, D', on G sourced from defect formation. The large increase in signal was attributed to a plasmonic enhancement from densely packed small gold nanoparticles. Palladium-soaked composites did not show similar enhancement.

Tracking the process through UV-Vis absorption spectroscopy (panel (b) of FIG. 3) on a quartz slide demonstrated complementary physical changes in the visible absorption that were substrate independent. COF-5 on top of graphene dominated the initial signal with a peak around 525 nm. Oxygen plasma decreased the general signal via removal of COF-5. Residual COF-5 remained after washing with ethanol, but the signal was still relatively weak compared to the initial and post plasma conditions. Soaking in a $HAuCl_4$ solution shifted the peak absorbance to 530 nm, indicating the formation of small gold nanoparticles.

Current voltage measurements (panel (c) of FIG. 3) served as a complementary method to track the progress of templated hole formation. Transferred graphene showed linear increases in current in response to source drain biases sweeping from −1 V to +1 V. COF-5 growth generated a general increase in current in response to bias voltage across the entire range. COF-5 was electronically coupled to the underlying graphene. Plasma etching decreased current across the entire range consistent with oxidation of the underlying graphene. Washing with ethanol removed most of the oxidized COF-5 and increased the current observed. Introduction of $HAuCl_4$ solution restored the current again to just below the level of the initial starting condition.

Liquid gated field-effect transistor (FET) measurements (panel (d) of FIG. 3) tracked the gate modulation of the current in response to the templating process. Initially, graphene demonstrated semi-metallic behavior with a p-type shift in the minimum conductance point that was attributed to atmospheric contamination and substrate effects. Liquid gating measurements could not be performed when the COF-5 was introduced as a result of the water sensitivity of COF-5. COF-5 templated patterning decreased current and gate modulation as compared to the initial FET measurements even after washing with ethanol. The minimum conductance point was so far p-shifted out of the electrochemical window that it could not be observed. Gold nanoparticle deposition reestablished much of the graphene's initial behavior with lower overall current and a slight shift in minimum conductance while retaining the overall same shape of the FET curve. Without limitation to any mechanism, reinstating semi-metallic behavior of graphene may, for example, be attributed to gold nanoparticles partially filling some of the holes.

Figure 4:
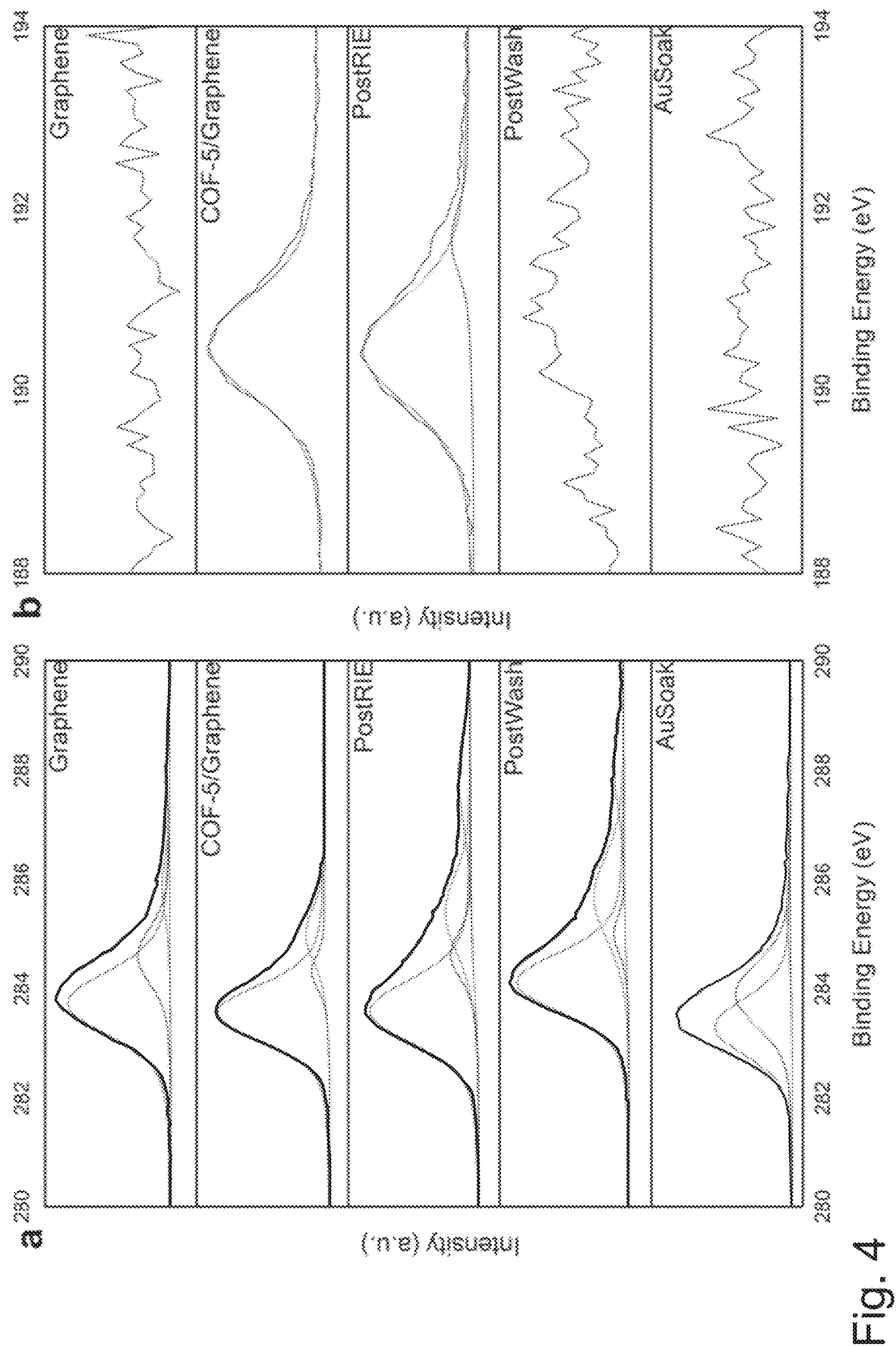
FIG. 4 illustrates high resolution XPS of both carbon and boron at each process action or step in the process on a prefabricated silicon chip wherein: panel (a) illustrates high resolution carbon is with deconvolutions of the signal; and panel (b) illustrates high resolution boron 1s with deconvolutions of signal, wherein the multiple, narrower lines in the figure represent deconvolutions of the overall signal into oxidation dependent peaks.

High resolution XPS data of carbon (panel (a) of FIG. 4) enabled tracking of relative ratios of functional groups throughout the patterning process. Initially, the signal of bare graphene was dominated by $sp^2$ carbon with minimal contributions of other carbonaceous species. Deposition of COF-5 resulted in a concurrent increase in the quantity of C—OR functionalities as per the chemical structure of COF-5. RIE raised the quantities of C—OR functionalities relative to the $sp^2$ peak while concurrently introducing C=O functionalities. Because of the small penetration depth of XPS and the relatively large amounts of COF-5 left on the surface at the end of RIE, as evidenced by SEM and UV-Vis, the more oxidized carbon contributions may, for example, be attributable primarily to COF-5. Washing with ethanol to remove leftover COF-5 revealed a shift to larger binding energies in the main $sp^2$ peak and significant contributions of C—OR and C=O functionalities. Higher binding energies were consistent with an increase in oxygen type defects and electronic depletion of the local chemical environment of the remaining $sp^2$ carbon network. Electron deficiency correlated well with the observed FET characteristics. Introduction of $HAuCl_4$ facilitated auto-reduction into gold nanoparticles with concomitant decreases in C—OR and C=O type functionalities and restoration of the $sp^2$ peak back to a level similar to unprocessed graphene.

High resolution XPS data of boron (panel (b) of FIG. 4) acted as a chemical handle to track the changes in COF-5 and the removal of COF-5 through ethanol washing. No boron signal was present in the initial graphene sample. COF-5 deposition revealed one boron peak that corresponded to the chemical structure of COF-5. RIE altered the local chemical environment of boron via reactive oxygen species as evidenced by the appearance of an additional boron peak at a higher binding energy. Ethanol washing removed the majority of remaining COF-5 as indicated by the disappearance of the boron peak. Lack of boron signal for the post-gold-soaking conditions confirmed no residual COF remained on the final material.

In a number of embodiments, the systems, methods, and compositions hereof provide, for example, an intermediate between the formation of graphite or graphene oxide and pristine graphite or single-layer graphene by introduction of patterned oxidative functionalities. In a number of studies with graphene, electrical characteristics in combination with the Raman measurements confirmed that a contiguous $sp^2$ carbon network remained after patterning. The restoration in the p-type semi-metallic behavior (see panel d of FIG. 3) confirmed that a measure of the initial properties of graphene can be restored by partial filling in of the patterned holes by metal.

Figure 5:
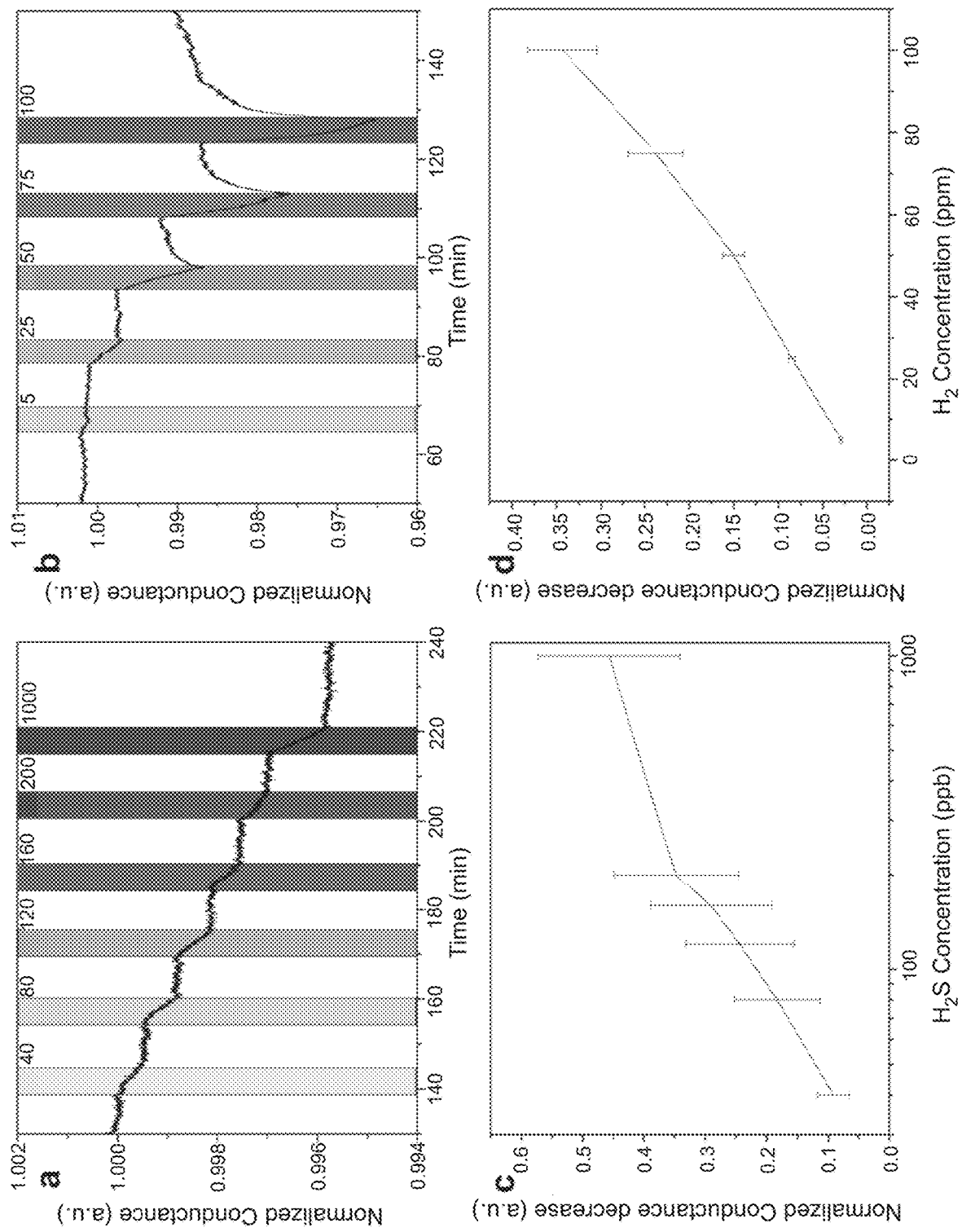
FIG. 5 illustrates room temperature gas sensing data for holey graphene composites, wherein: panel (a) illustrates a gold nanoparticle composite showing a decrease in conductance in response to $H_2S$ (ppb) in synthetic air; panel (b) illustrates a palladium composite showing both irreversible and reversible responses to $H_2$ (ppm) in synthetic air; and panels (c) and (d) illustrate averaged normalized conductance changes with standard deviation for $H_2S$ (n=6) and $H_2$ (n=4) sensing, respectively.

Such patterned holes act as both reduction sites as well as a ligand environment for the formed nanoparticles. Interconnected metal nanoparticles through an electrically conductive graphene environment provides, for example, an excellent platform for sensing various analytes. In a study of applications outside of Raman enhancement (panel (a) of FIG. 3), both gold- and palladium-salt-soaked systems were tested for room temperature gas sensing applications of $H_2S$ (see panel (a) of FIG. 5) and $H_2$ (see panel (b) of FIG. 5), respectively. Both systems showed remarkable sensitivity for their respective gaseous analytes with $Au/H_2S$ having a calculated limit of detection of 3 ppb and the $Pd/H_2$ having a limit of detection of 10 ppm. Both systems showed reproducibility across different complete synthetic cycles with averages and standard deviations for a different run shown for responses in (see panels (c)-(d) of FIG. 5).

The gold composite sensor exhibited an irreversible response as a result of the known strong gold-sulfur interaction. Gold composite response was qualitatively similar in air as compared to $N_2$. The gold composite response was relatively unaffected by the different gold nanoparticle size distributions as a result of the surface-based interaction method of sulfur with gold. The effect of the gold electrodes on the sensing response corresponded to a small percentage of overall response at the highest concentration as confirmed by control experiments conducted under the same gas sensing conditions utilizing a graphene sample. The palladium composite sensor was believed to have an initially irreversible response as a result of larger nanoparticles generated at more oxidized sites that have slower recovery kinetics as compared to the smaller nanoparticles confined to the COF-templated holes. In $N_2$, the palladium composite lacked recovery and eventually saturated response. Lack of recovery may be attributed to the need for $O_2$ to remove the hydrogen from the palladium nanoparticles.

The responses for gas sensing demonstrated herein are near the top of performance for limits of detection as exhibited by other graphene-based composites. There are only two reports of lower limits of detection for $H_2$ sensing, and the $H_2S$ sensing limit hereof is believed to be the lowest limit of detection reported to date for a graphene-based composite. Without limitation to any mechanism, the quality of the gas sensing behavior herein may, for example, be attributed to a combination of the ~3 nm metal nanoparticles with the high conductivity that the holey graphene layer hereof provides for transduction. The systems, methods and compositions hereof provide a route to pattern, for example, ~2.7 nm holes in graphene via COF-5 at high resolution and density, side-stepping expensive processes like e-beam lithography and other traditional patterning methods. The composites formed through auto-reductive soaking retain many of the properties of graphene, including its semi-metallic nature while also enabling ~3 nm nanoparticle growth electronically coupled with graphene. The applications exhibited are of great interest, for example, in both Raman enhancement and gas sensing applications as a result of the relative ease of fabrication when compared to other, more expensive and complicated techniques. Once again, the $H_2$ (10 ppm) and $H_2S$ (3 ppb) sensing limits of detection demonstrated herein are comparable to the best results from other graphene-based composites.

In the case of graphitic materials, the substrate materials hereof provide for retention of $sp^2$ conjugation that is lost in previous, unpatterned oxidation processes, thereby enabling retention of some of the desirable electronic properties of graphitic materials. To generate patterned materials on a milligram scale as required in, for example, electrocatalytic applications (while also retaining $sp^2$ conjugation), a synthetic procedure was developed for the generation of high-density holes in, for example, graphite such as highly ordered pyrolytic graphite (HOPG) with subsequent exfoliation of such materials into aqueous environments to provide holey graphene materials.

Figure 6:
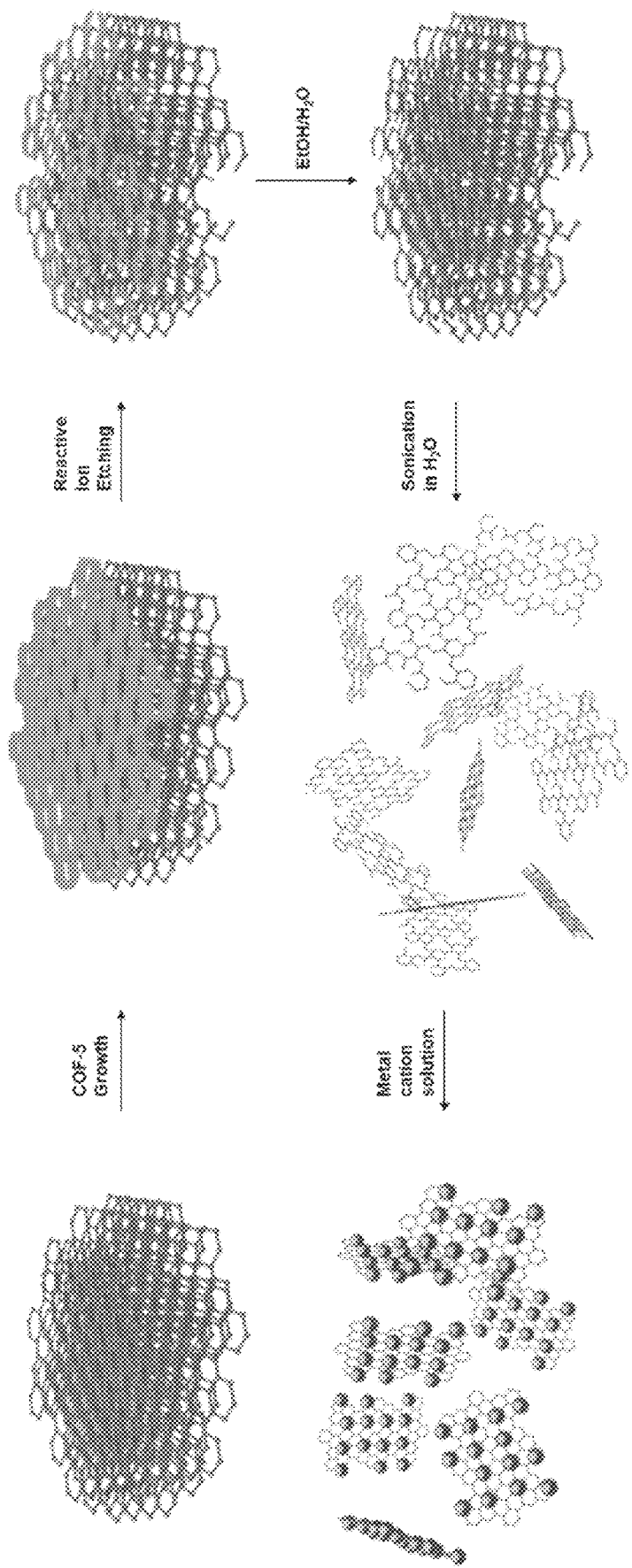
FIG. 6 illustrates a synthesis scheme for holey graphene nanoparticle composites derived from multi-layer, highly ordered pyrolytic graphite or HOPG flakes.

In that regard, an embodiment of a scalable technique for the generation of holey graphene materials (HGm) (average of 38% mass exfoliated from a given flake n=27) derived from HOPG is illustrated in FIG. 6. Holey graphene materials are synthesized by depositing a covalent organic framework (COF) template as described above onto HOPG flakes followed by etching (for example, via reactive ion etching or RIE). Production of holey graphene materials by this method has several distinct advantages over current synthetic techniques. Relatively large sheets measuring micrometers in diameter may be decorated with dense few-nanometer-sized holes imprinted from the patterned COF. Both metal nanoparticles and metal compound (for example, metal oxide/hydroxide) nanoparticles can be grown into the holes at room temperature without the use of additional reducing agents. Without limitation to any mechanism, a hypothesized mechanism for this growth is the intact conjugated $sp^2$ network donating electrons to facilitate reduction of the nanoparticles in addition to typical further oxidation of the holey graphene edge moieties. As described above, the patterned holes of the holey graphene materials act as confining sites restricting the overall size of the nanoparticles preventing nanoparticle aggregation. The nanoparticles were found to be held in place by the underlying holey graphene materials even in the presence of high energy electron beams (200 KeV). Spherical size-limited nanoparticle growth is dictated by the relative ratio of metal salt precursor to HGm.

For the process of RIE-COF-5 patterning, good control over both the COF growth and RIE conditions is desirable. In a number of embodiments, for example, if a ratio of hexahydroxytriphenylene:phenylbisboronic acid (HHTP:PBBA) used in growing COF-5 falls significantly outside of the ratio of 3:4, the patterning may be inconsistent, leading to under-patterning or over-patterning if the HHTP is too high or too low respectively. Such ratios are readily empirically determinable for various COF/substrate systems. SEM studies using constant RIE conditions on COF-5 decorated HOPG (400 mTorr 150 W 40 seconds) with slight variation in the growth conditions of the COF-5 demonstrated that a 0.1 mg excess of HHTP yielded reduced hole formation, although large trenches could still be seen. The defined ratio of HHTP to PBBA yielded well defined patterning which was excessive as compared to an optimized material as a result of the length of the RIE process.

Figure 7A:
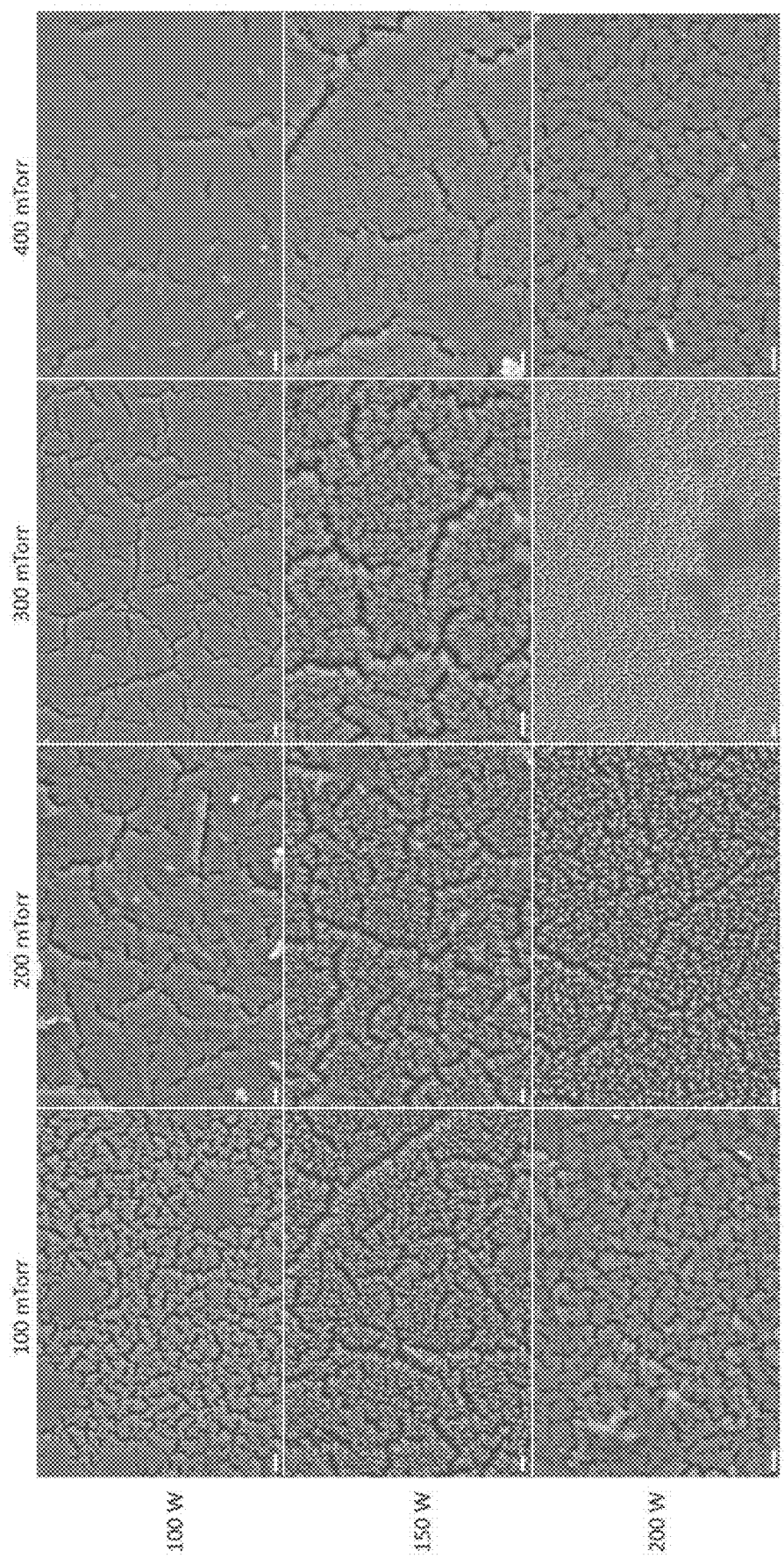
FIG. 7A illustrates SEM micrographs of an RIE optimization process in which a single COF-5 synthesis was run on a highly ordered pyrolytic graphite (HOPG) flake which was separated into 12 separate pieces before RIE process was performed including a range of four different pressures and three different powers, which were explored systematically at a given time of 30 seconds, and in which both over-patterning (150 W/200 mTorr and 200 W/200 mTorr) and under-patterning (100 W/400 mTorr) conditions can be identified (wherein all scale bars are 200 nm).

A wide range of RIE conditions were also explored. SEM and Raman studies of the RIE optimization process were conducted wherein a single COF-5 synthesis was run on an HOPG flake. As described above, in the case of single layer graphene, optimization of conditions was based on the electronic properties (current on/off ratio) of FET devices. In the studies with HOPG, optimization was based on both perceived discrete hole formation in SEM as well as Raman characteristics like formation of D' peak and relatively small D to G ratios. An additional consideration is the formation of relatively deep holes to maximize material generated which leads to less forgiving optimization because of the use of stronger plasma for patterning. Optimization was initially performed with respect to RIE pressure and power while holding time constant. Such optimization procedures focused on formation of patterns over large areas without over-etching the top layer as observed in SEM/TEM. FIG. 7A, for example, illustrates SEM micrographs of an RIE optimization process in which single COF-5 synthesis was run on an HOPG flake which was separated into 12 separate pieces before RIE process was performed, including a range of four different pressures (100, 200, 300 and 400 mTorr) and three different powers (100, 150 and 200 W), which were explored systematically at a given time of 30 seconds. Both over-patterning and under-patterning conditions can be identified. In FIG. 7A, all scale bars are 200 nm. After identifying desired morphological characteristics from the pressure and power conditions, time was optimized to yield deepest patterning to maximize the production of material. The goal of the optimization was to optimize contiguous flake size while achieving dense and deep patterning of holey features. While two condition sets emerged as viable, only 200 mTorr with 100 W for 30 seconds was selected for further study to limit redundancy.

Figure 7B:
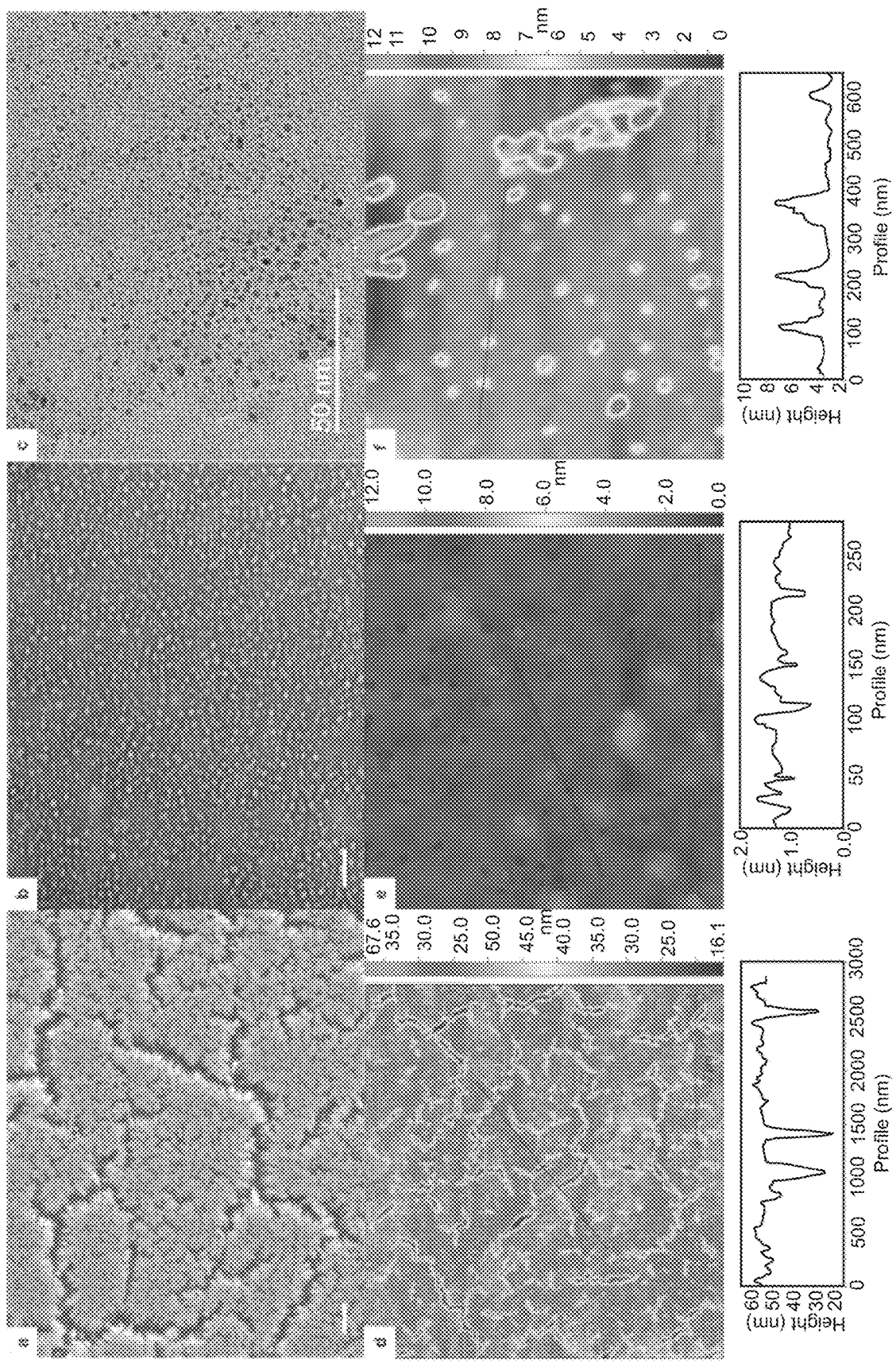
FIG. 7B illustrates electron and atomic force microscopy (AFM) studies of the synthesis of holey graphene material composites wherein: panel (a) illustrates an SEM micrograph of HOPG flake after RIE-COF-5 templated etching under optimized conditions (scale bar 200 nm); panel (b) illustrates a TEM micrograph of an exfoliated holey graphene sheet (scale bar 50 nm); panel (c) illustrates a high-resolution TEM or HRTEM micrograph of copper nanoparticle composite; panel (d) illustrates an AFM micrograph of RIE-COF-5 templated etching; panel (e) illustrates an AFM micrograph of an exfoliated holey graphene sheet on mica; and panel (f) illustrates an AFM micrograph of a copper nanoparticle holey graphene composite on silicon wafer, wherein the profiles for each AFM micrograph are displayed below the respective micrograph.

The patterning yielded under various conditions was demonstrated via SEM (see panel (a) of FIG. 7B). Dense features were present across large areas of the HOPG flake and contiguous flakes that are larger than one micrometer on a side could be identified. Exfoliation into water yielded a substantial amount of materials that were synthesis dependent. After three hours of sonication, as little at 0.1 mg/ml can go into solution and as much as 1 mg/mL can be present. TEM observations of ten times diluted solutions can be used to evaluate the retention of patterning after exfoliation (seen panel (b) of FIG. 7B). Large flakes can still be identified in the TEM images, with dense patterning of nanometer sized features (4.30 nm±1.52 nm n=83). After stirring with an empirically optimized concentration of metal salt solution for one hour, numerous nanoparticles can be identified (see panel (c) of FIG. 7B). The formed nanoparticles exhibited a relatively small size distribution with particle size that matched the COF hole pattern well (2.86 nm±0.66 nm n=43).

AFM imaging of the patterned flakes after washing the residual COF from plasma etching revealed correspondence between SEM imaging and AFM (see panel (d) of FIG. 7B). While the holes show minor height differences as compared to the top of the flake, the trenches formed show more than 30 nm of height difference. This result indicates patterning was potentially reaching as deep as 100 layers into the HOPG, assuming 0.33 nm interlayer spacing. The primary reason that AFM imaging does not reveal more depth for the top features is the relatively small horizontal features which inhibit the tip from probing the deep features. Trenches can be viewed as non-ideal patterning, but the density of the trenches still leaves micrometer-sized flakes that are retained after exfoliation. AFM of exfoliated sheets revealed large sheets with a wider distribution of holes than the as-patterned HOPG but still demonstrating single layer thickness (panel (e) of FIG. 7B). Single sheets were observed (see panels (b) and (c) of FIG. 7B), but most of the material formed was in the form of multilayer flakes. Such a result is expected without special consideration devoted toward yielding single-layer material. AFM of the copper composite revealed correspondence between TEM imaging of the size distribution of the nanoparticles and the height distribution of the features observed by AFM (panel (f) of FIG. 7B).

Control experiments with no RIE failed to yield any exfoliation into water as a result of dissimilar surface energies of HOPG and water. RIE processing without COF templating yielded material into water which is colloidally stable at lower concentrations but lacks the holey structure of COF-templated procedure. There are two important differences between the materials hereof and those of the control experiment. The observed zeta potential was much larger, and the size of sheets was much smaller. The contrast between the holey material and the RIE control can be viewed as the difference between indiscriminate introduction of oxygen functionalities as compared to purposeful control of defects. While more oxygen functionalities will convey more colloidal stability, there is a lack of control in the resulting material and an absence of larger sheets that are potentially useful in applications that require longer distance patterning.

The introduction of nanoparticles onto the surface of the holey graphene materials shows both concentration and time dependence. In a number of studies, we fixed the concentration of holey graphene materials and varied the concentration of the metal salt. Widespread applications in catalysis are, for example, possible with graphitic and other substrates hereof because of the strong coupling present between the introduced metal species and the underlying substrate (for example, a holey graphene material).

Figure 8:
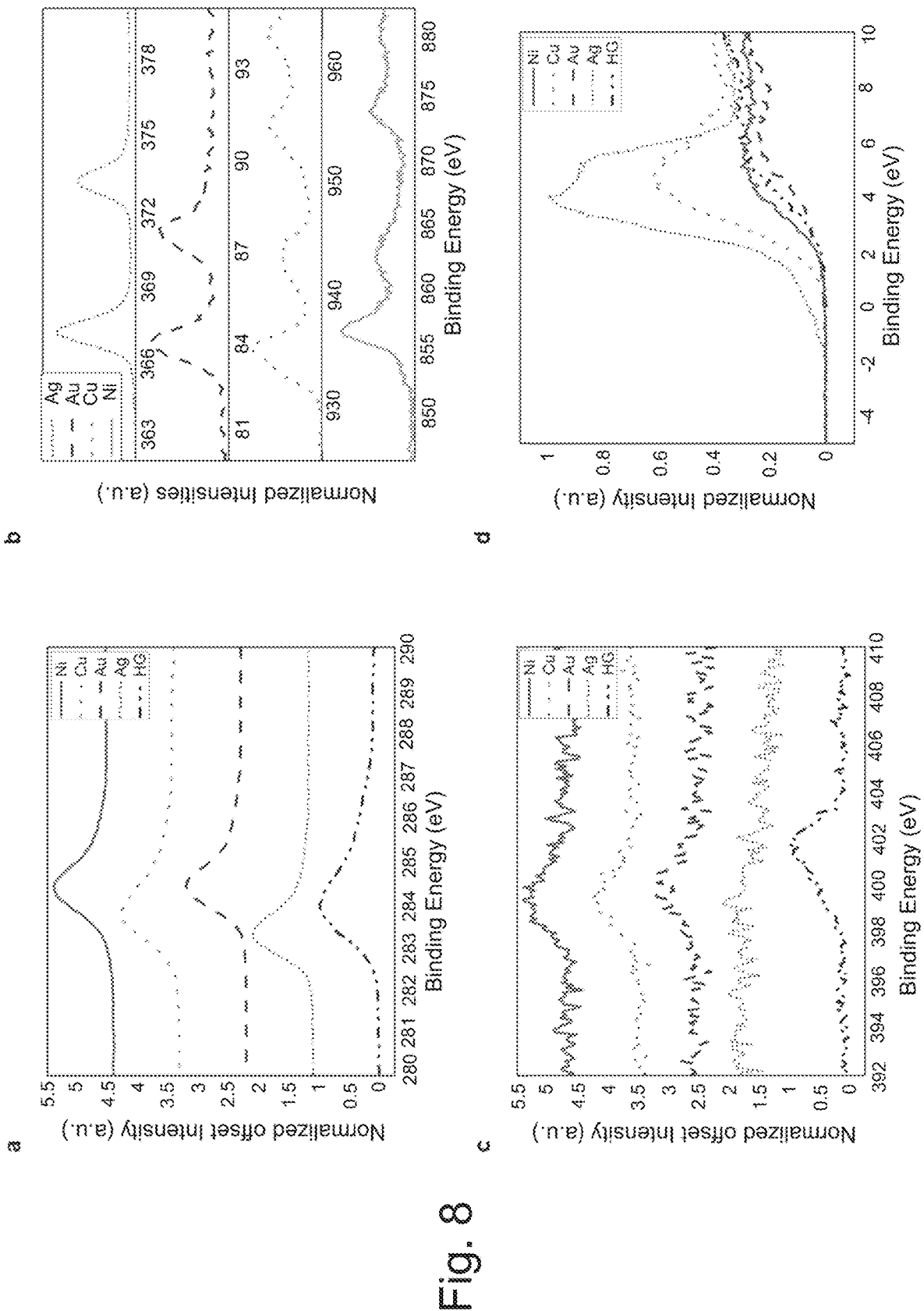
FIG. 8 illustrates XPS of as-exfoliated holey graphene material and metal decorated composites wherein: panel (a) illustrates high resolution carbon XPS scans of the holey graphene material and the different metal composites; panel (b) illustrates high resolution metal XPS of the relevant region for each metal composite; panel (c) illustrates high resolution nitrogen XPS of the holey graphene material and the different metal composites; and panel (d) illustrates valence XPS scans of the holey graphene material and the different metal composites.

To elucidate the strong metal coupling between the holey graphene material and the metal nanoparticles, a series of high resolution XPS experiments were performed (see FIG. 8). High resolution carbon XPS reveals substantial differences of chemical moieties present in the as exfoliated holey graphene material and each of the nanoparticle composites tested (see panel (a) of FIG. 8). The as-exfoliated holey graphene material shows a substantial tail at higher binding energies as compared to the base sp$^2$ peak at 284 eV, which may, for example, be attributable to a combination of oxygen and nitrogen containing moieties including hydroxyl, carbonyl, amino, and graphitic nitrogen. Such an observation may, for example, be supported by FTIR of the holey graphene material which reveals similar features. Although each nanoparticle composite showed different base sp$^2$ shifts, the overarching reduction of in the tail features of the main peak can be used to indicate that that such functionalities are either being coordinated by or consumed in the reduction of the nanoparticles.

High resolution XPS of each of the relevant metal regions was taken to confirm the oxidation state and presence of the metals following the metal salt soaking procedure (panel (b) of FIG. 8). Both silver and gold composites demonstrated the presence of metal(0) states in the expected regions. Copper and nickel samples had relatively more complicated spectra that cannot be fitted with single oxidation states. Although identification of copper oxidation state by XPS is somewhat ambiguous, the presence of satellite peaks at 945 and 963 eV indicated copper(II) oxide being present. The shoulder in the main peak at 935 eV indicated the presence of a secondary oxidation state that could be copper(0) or (I). Additional HRTEM imaging demonstrated the presence of copper metal as well as copper(I) oxide by lattice fringe. No copper(II) oxide lattice fringes could be observed under HRTEM, but the electron beam acting as reductive source cannot be ruled out. Additionally, the presence of the oxide formation in the XPS experiment could, for example, be attributable to the deposition process used to prepare the samples. In general, the copper present is a mixed valency species that is susceptible to oxidation under mild heating. The presence of nickel hydroxide was confirmed by the relatively higher binding energy of the main peak at 857 eV. An additional oxidation state cannot be ruled out as the small shoulder to the main binding peak on the lower binding energy side was indicative of nickel(0). HRTEM of nickel composite confirmed the presence of nickel(0) lattice fringes but the same considerations for the copper are applicable to nickel as well.

Introduction of holes into the HOPG via COF-templated patterning also induced relatively substantial amounts of nitrogen from RIE patterning (panel (c) of FIG. 8). Without limitation to any mechanism, it was hypothesized that the nitrogen incorporation was a result of dangling bonds present immediately after RIE patterning that were satisfied by $N_2$ flushing of the system as it was brought up to room pressure. The main binding peak in the as-exfoliated materials could not be deconvoluted into a single peak and indicated the presence of at least 2 types of nitrogen. The lower binding peak around 399/400 eV, may, for example, be attributable to amino type functionalities that were conjugated on the edge of the graphitic structure. The larger peak centered around 401.5 eV, may, for example, be assignable to embedded nitrogen on the edge of the graphitic structure. The presence of nitrogen was persistent even after metal loading, albeit with different binding energy, which indicates their edge location. In the metal sample (silver) with the greatest success in nanoparticle decoration, no appreciable nitrogen could be detected after the reaction. These spectra indicated that nitrogen edge functionalities could be responsible for enhanced reductive power of the holey graphene materials hereof.

Valence XPS may be used as tool to evaluate changes in the overall electronic structure of materials (see panel (d) of FIG. 8). All metal composites showed different valence structure than the as-exfoliated material. Prominently, silver and copper composites showed large d electron peaks and substantial shifts in the valence band edge as compared to holey graphene material. Both gold and nickel showed some shift in valence band edge but more minor in comparison. Valence band shifts as compared to initial exfoliated material indicated that there were substantial electronic changes to the overall material occurring, which is indicative of strong electronic coupling between the formed nanoparticles and the underlying holey graphene material.

Figure 9:
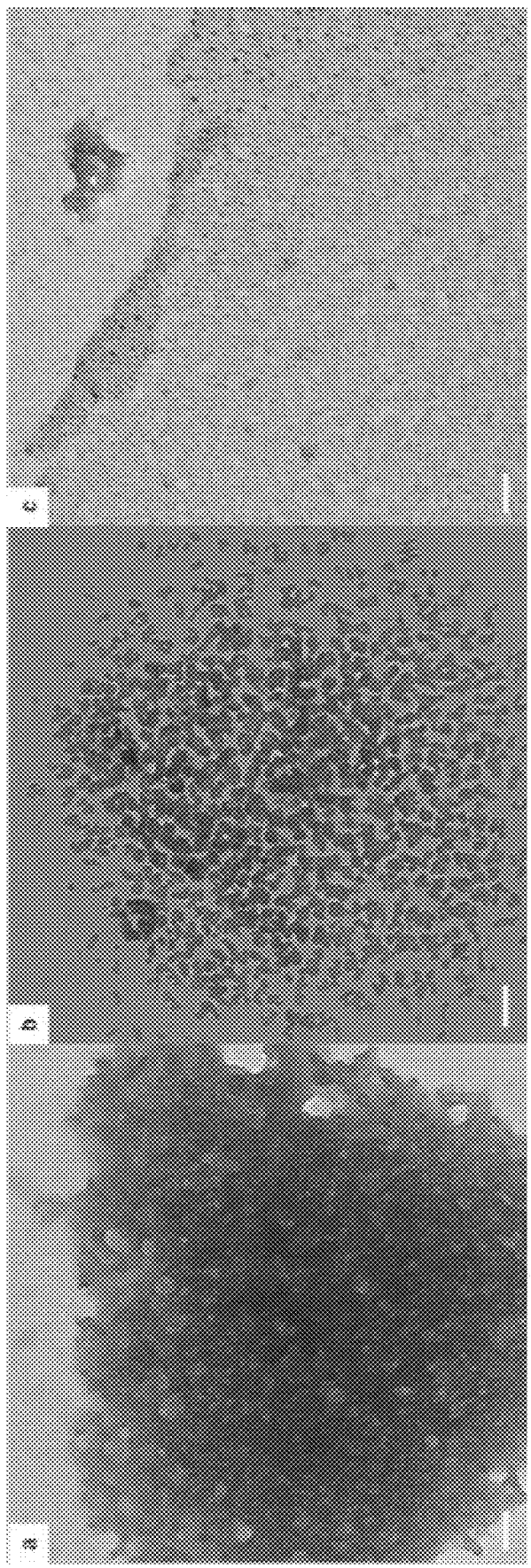
FIG. 9 illustrates TEM micrographs of different copper composite syntheses at progressively lower ratios of copper (II) chloride to holey graphene material or HGm wherein: panel (a) illustrates 5 mg/mL of $CuCl_2$ to 0.146 mg/mL HGm (scale bar 100 nm); panel (b) illustrates 2.5 mg/mL of $CuCl_2$ to 0.146 mg/mL HGm (scale bar 200 nm); and panel (c) illustrates 2 mg/mL of $CuCl_2$ to 0.146 mg/mL HGm (scale bar 50 nm).

The resulting nanoparticle size showed a sensitive concentration dependence which may be illustrated through TEM (see FIG. 9) but was also supported through UV-Vis studies. Initially, at higher concentrations, formation of reduced structures completely overwhelmed the size confining ability of the patterned holes (see panel (a) of FIG. 9). Overwhelming the patterned holes of all composites is observable, albeit with different concentrations, for different metal precursors. As the concentration was reduced (see panel (b) of FIG. 9), overgrowth was still observed, but some of the size defining effect of the patterned holes can be observed as discrete structures which can be resolved. Further reduction can yield well defined nanoparticles that show little to no overgrowth (see panel (c) of FIG. 9). Additional reductions in metal precursor concentration showed no additional benefits and less overall nanoparticle formation at a given time point. Although the above observations were for concentrations at a relatively short time point (1 hour), the overall size limiting behavior observed for the optimized concentration persisted into long time points with more complete decoration. Desirable or optimal concentration, time and/or other conditions for nanoparticle growth can be readily determined for various systems using the knowledge of those skilled in the art and the disclosure hereof.

Figure 10:
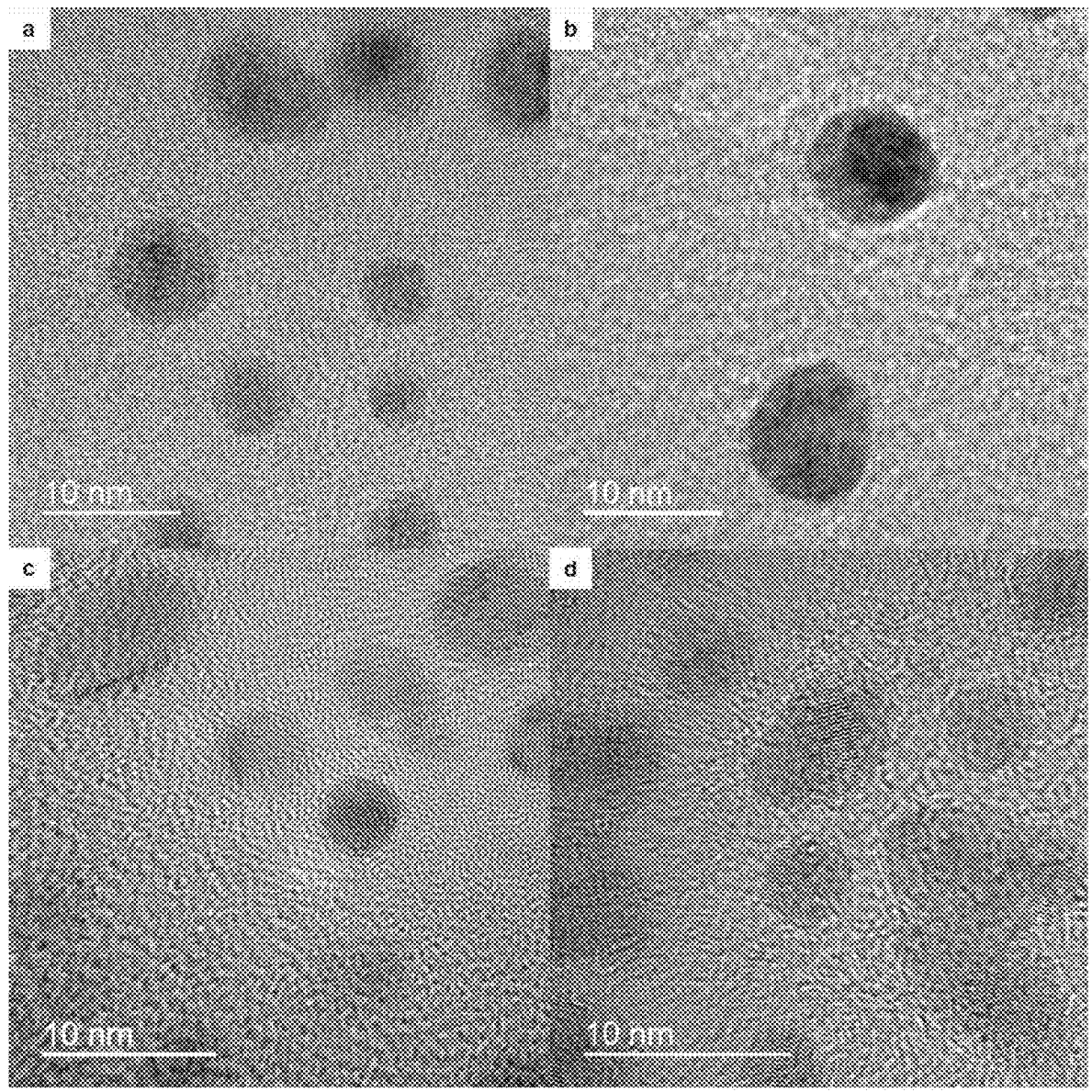
FIG. 10 illustrates HRTEM micrographs of metal decorated holey graphene material composites wherein: panel (a)

HRTEM micrographs may be used to clarify the identity and oxidation state of the nanoparticles present in the composites hereof (see FIG. 10). For both of the more positive reduction potential metals, silver and gold, the composites showed small nanoparticles with lattice spacing that can be indexed to the metal(0) oxidation state (see panels (a) and (b) of FIG. 10). Both single orientation of lattice spacing and multiple different lattice spacing growing together can be observed in the micrographs. Variability in lattice orientation indicated that the holes can support the growth of a single nanoparticle with a single nucleation site or multiple nucleation sites may form around the hole and grow into a single nanoparticle. Although many nanoparticles were spaced relatively far apart as compared to the dimensions of the COF, there were several instances where nanoparticles were within a few nanometers of each other. Small inter-nanoparticle distances were relevant for a variety of technical applications which are currently unexplored because of the difficulty of placing nanoparticles in proximity. The materials hereof may, for example, provide a route to such underexplored regimes. Further examination of the lattice spacing of the relatively negative reduction potential metals, copper and nickel, revealed more complex lattice spacing that could not be attributed to single oxidation states (see panels (c) and (d) of FIG. 10). Such behavior was somewhat expected because, even if the nanoparticles were prepared in a metal(0) state, both metals are much more prone to oxidation than silver or gold species.

Zeta potential and dynamic light scattering (DLS) were also measured to evaluate both the stability and size distributions of both the initial exfoliated material as well as the material after metal decoration. Holey graphene materials hereof are colloidally stable at lower concentrations (0.059 mg/mL zeta potential of −30.1±10.2 mV) as a result of the abundance of oxygen-containing functional groups introduced during the RIE process. DLS revealed two distinct size distributions centered around 150 nm and 950 nm, indicating a range of material in solution. Each of the other composite materials zeta potential and size distributions showed somewhat different behavior as compared to the holey graphene material. A significant distinction is the reduction of smaller size flakes and retention of a negative zeta potential albeit at varying magnitudes. The limiting of the small size distributions may, for example, be attributable to the effect of centrifugation as part of the composite synthesis. As only the pellet was resuspended, one can expect a shifting toward material that is more easily precipitated. Without limitation to any mechanism, the negative zeta potential may, for example, be ascribed to the retention of anionic salts to act as weakly bound ligands to composites nanoparticles. The relatively weakly bound nature of these ligands should ensure that they can be removed for use, for example, in catalytical applications as needed.

Milligram scale processes for production of holey graphene from a graphite materials such as HOPG via, for example, a COF-5/RIE process were thus demonstrated. The resulting material can be exfoliated into water and can have flake sizes ranging in 1 or 2 micrometers patterned with dense nanometer sized features. The resultant materials are, for example, active for a broad reduction potential range of size limited nanoparticles contingent on the relative ratio of metal salt to holey graphene material. Both metal(0) and metal oxide/hydroxide states were observed to form in an element dependent fashion without additional reducing agents. Formed composites demonstrated strong electronic coupling between carbon and metal resulting in large changes to carbon and valence XPS of the material. Nanoparticle growth can overwhelm the hole sites at higher concentrations forming larger agglomerations. At lower concentrations metal nanoparticles can remain contained in their respective sites and cover large areas of the holey graphene material. All composite materials were metastable with negative zeta potentials.

To evaluate these GNCs as electrocatalytic platforms, the activity of the Ni-GNC for oxygen evolution reaction (OER) activity was investigated (FIG. 11). GNCs can serve as a platform to reduce overall metal usage, provide additional conductivity to boost catalytical activity, and reduce sintering.

Current of 5 mA can be seen at 1.7 V potential vs RHE for 80 μg of Ni-GNC deposited onto a glassy carbon electrode (FIG. 11, panel a). Onset potential for catalysis is at 1.53 V vs RHE, on par with other $Ni(OH)_2$ based OER catalysts. Catalytic activity shows stability over 2 hours of continuous operation at 1.6 V vs RHE (FIG. 11, panel b). This performance serves as indirect evidence of the stability of the nanoparticles to remain inside of the holes and avoid sintering. Tafel slope (see FIG. 11, panel c) of the Ni-GNC composite is 67.5 mV/dec, the value is also consistent with other $Ni(OH)_2$ based catalysts. Electrochemical impedance spectroscopy was used to evaluate both surface area and the favorability of charge transfer after the onset potential. Equivalent circuit modeling at open circuit potential (1.28 V vs RHE) reveals large resistance to charge transfer (22570 Ohms) and 20 μf capacitance. Similar capacitances were observed under working potentials of 1.6 V and 1.7 V vs RHE (reversible hydrogen electrode) but with dramatically reduced charge transfer resistance (193 and 133 Ohms, respectively). Additional confirmation of capacitance values was obtained by differential scanning of cyclic voltammetry in a 0.05 V non-faradaic window around 1.28 V vs RHE (Figure S29). Assuming a specific capacitance of 40 $\mu F/cm^2$ in 1 M KOH, the overall electrochemically active surface area is approximately 0.61 $cm^2$. Without limitation to any mechanism, the relatively small area may be attributable to a preference for restacking during deposition on electrode as well as a presence of NAFION® (an ionomer formed of a sulfonated tetrafluoroethylene based fluoropolymer-copolymer) in the catalyst ink blocking active sites.

Further improvements in onset potential could be induced through pre- and post-synthetic doping strategies to generate multi-metallic hybrids (for example, Ni—Fe hybrids). Synthetic conditions for studied Ni—Fe GNC composite materials were similar to single metal deposition in holey graphene materials and based in a solution phase process. In a number of representative studies, the relative mass ratios of nickel chloride to iron chloride to HOPG derived holey graphene were 10 mg/mL to 5 mg/mL to 0.25 mg/mL. The washed material was retrieved after several cycles of centrifugation and washing of the generated pellet. The supernatant of the reaction was discarded. A dense integration of the metal across the holey graphene substrate was confirmed via, for example, SEM.

The above representative synthetic route was taken in a number of studies. It is also possible to sequentially introduce different metal salts to form a multi-metallic composite. To minimize galvanic displacement, the more noble metal (that is, the metal less susceptible to oxidation as measured by standard reduction potential) should be deposited first.

FIG. 12A illustrates a linear sweep voltammetry study in 1M KOH for oxygen evolution reaction (OER) catalysis for Hg, Ni and NiFe electrocatalysts demonstrating an improved onset potential for the multi-metallic composite (NiFe) over the single metal (Ni). The improvement in onset potential is evidenced by the leftward shift of the NiFe-GNC curve as compared to the Ni-GNC curve. The thermodynamic potential at which OER occurs is 1.23V vs RHE. Any additional potential being applied is a result of kinetic limitations (activation barriers). The closer the beginning of the current onset is to the thermodynamic potential, the better the catalyst is.

Valence band XPS studies were performed as illustrated in FIG. 12B to determine the electronic states of the material that are most susceptible to ionization. The differences between the Hg and the two different metal composites are indicated by the changes in the curves close to 0 eV. Both the Ni and NiFe GNC showed enhanced electron density, indicating that there are more electrons available to be ionized at a lower potential. Those electronic states are the electronic states contributing to catalytic activity. Differences between the Ni and the NiFe material may provide a physical justification for the differences in observed electrocatalytic activity.

FIG. 12C illustrates an iron XPS study of the composite materials of FIG. 12A. $Fe_2O_3$ was determined to be the primarily observed species in the multi-metal composite material. Such studies confirm that iron is being incorporated into the final material and provide an understanding of the oxidation state present. FIG. 12D illustrates a nickel XPS study for the composite materials of FIG. 12A. $Ni(OH)_2$ was the determined to be the primary species in both the metal and multi-metal GNC composites materials, which confirms that both composite materials have nickel present in similar oxidation states.

Experimental Examples

APCVD growth of graphene. Cu foil was cut into 1 cm×1 cm squares. The foil was cleaned by submerging into either 1 M HCl or 5.4% w/w $HNO_3$ for 30-40 seconds. After removal from the cleaning solution the Cu foil was washed thoroughly with deionized water (18.2 MΩ cm$^{-1}$) and then blown dry with $N_2$ to remove all residual moisture.

The Cu foil was loaded onto a quartz crossplate and sealed into a 1-inch inner diameter quartz tube. The tube was loaded into the CVD oven and began a purge with argon (900 sccm) and hydrogen (50 sccm). After purging for 30 minutes the oven was ramped up to 980° C. over a period of 20 minutes. Cu foil was annealed at 980° C. for 10 mins at which point methane (10 sccm) was introduced to the oven for 30 mins. At this point, both the CH4 flow and oven were shut off and the tube began cooling in air.

COF-5 growth (graphene). Heavy walled glass container was cleaned with a series of ethanol and deionized water washes before drying in an oven at 90° C. for 1 hour. 6.25 mg of phenylbisboronic acid and 4.00 mg of 2,3,6,7,10,11-hexahydroxytriphenylene were placed within the vessel. 0.5 mL of 1,4-dioxane and 0.5 mL of mesitylene were added to the reaction vessel and left sealed for 30 minutes of bath sonication. After sonication, graphene containing substrates were introduced to the vessel and left in an oven at 90° C. for 40 minutes. The reaction vessel was allowed to cool to room temperature before removing the substrates and placing them in toluene overnight. The powder was washed with toluene and recovered via vacuum filtration. Substrates were sonicated the next day in toluene for 10 seconds and then placed in vacuum to thoroughly dry.

Reactive ion etching (graphene). Trion Phantom III LT RIE was used to etch substrates. The following conditions were used for etching: 300 mTorr pressure with 50 W of power and 50 sccm of 02 flow. The process conditions were run for 27 seconds (determined via empirical optimization). After etching, the substrates were washed with ethanol, nanopure water and ethanol again to remove residual polymer.

Metal nanoparticle formation. Substrates with holey graphene were soaked in 150 μL of either 1 mM $HAuCl_4$ or 1 mM $Pd(acac)_2$ for two hours at room temperature in the dark. After two hours the substrates were washed copiously with nanopure water and blow-dried with $N_2$.

COF-5 Growth (graphite). As described above in connection with graphene, a heavy walled glass container was cleaned with a series of ethanol and deionized water washes before drying in an oven at 90° C. for 1 hour. 6.25 mg of phenylbisboronic acid (PBBA) and 4.00 mg of 2,3,6,7,10,11-hexahydroxytriphenylene (HHTP) were placed within the vessel. 0.5 mL of 1,4-dioxane and 0.5 mL of mesitylene were added to the reaction vessel and left sealed for 30 minutes of bath sonication. After sonication, 1×1 cm flakes of highly order pyrolytic graphite (HOPG) were introduced to the vessel and left in an oven at 90° C. for 40 minutes. The reaction vessel was allowed to cool to room temperature before removing the HOPG flake and placing them in toluene overnight. The powder was washed with toluene and recovered via vacuum filtration. Substrates were sonicated the next day in toluene for 10 seconds and then placed in vacuum to thoroughly dry for several hours.

Reactive ion etching (graphite). Trion Phantom III LT RIE was used to etch HOPG flakes. The following conditions were used for etching: 200 mTorr pressure with 100 W of power for 30 seconds and 50 sccm of 02 flow were chosen as the final conditions. After etching, the substrates were washed with ethanol, nanopure water and ethanol again to remove residual polymer. HOPG flakes were dried in vacuum after the wash to retrieve an initial starting mass used to estimate concentration in solution.

Exfoliation into solution. Dried patterned HOPG flakes were massed and then placed into 2 mL of nanopure water in a 1 dram vial. Sonication proceeded for 3 hours to attempt maximal retrieval of patterned material. After sonicating, the solution was retrieved and placed into a separate 1 dram vial for storage. The flake (if remaining) would be retrieved and dried under vacuum for several hours before massing. The mass difference between before and after sonication was used to estimate concentration in solution.

Nanoparticle formation (exfoliated graphene materials). Solutions of holey graphene material were diluted to 0.292 mg/mL and mixed with a variety of metal salt solutions at different concentrations. The following metal salts were used: $AgNO_3$, $HAuCl_4$, $CuCl_2$, and $NiCl_2$ Concentrations ranged from 10 mg/mL to 0.1 mg/mL. The typical process was to introduce 1 mL of 0.292 mg/mL HGm to 1 mL of x mg/mL metal salt solution in a 1-dram vial with a stirbar. The stirbar was set at 800 rpm and the reaction was carried out in the dark at room temperature. All screening for nanoparticle decoration was conducted with one-hour reaction while more complete coverage of nanoparticles was achieved with six-hour reactions. After the reaction was completed, the solutions were centrifuged down for 30 minutes. The supernatant was recovered and 2 mL of nanopure water were added for an additional centrifugation. The second supernatant was discarded, and the final solutions were brought up in 1 mL of nanopure in a 1-dram vial.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A method of forming a pattern in a substrate material, comprising:
    positioning a layer of a covalent organic framework polymer comprising nanoscale pores therein over the substrate material as a template having nanoscale pores therein to form a templated assembly; and
    applying an etching process to the templated assembly to etch through the covalent organic framework polymer to form the pattern in the substrate material.

2. The method of claim 1 wherein the etching process is an oxidative etching process.

3. The method of claim 2 wherein the etching process is a chemical oxidation process, an electrochemical oxidation process, a plasma process, or a photochemical reaction.

4. The method of claim 2 further comprising, after applying the oxidative etching process, removing remaining covalent organic framework polymer.

5. The method of claim 1 wherein the layer of covalent organic framework polymer is positioned on the substrate material under a pressure suitable to orient the covalent organic framework polymer relative to the surface of the substrate material such that the pores of the covalent organic framework polymer align generally normal to the surface of the substrate material.

6. The method of claim 1 wherein the substrate material is a graphitic material and the pattern in the graphitic material resulting from the etching process comprises holes through the graphitic material.

7. The method of claim 6 wherein the graphitic material is a multilayer graphite or graphene.

8. The method of claim 7 wherein the graphitic material is a multilayer graphite, the method further comprising separation of layers of holey graphene after removing the remaining covalent organic framework polymer.

9. The method of claim 7 wherein the multilayer graphite is highly ordered pyrolytic graphite.

10. The method of claim 1 further comprising depositing nanoparticles of at least one of a metal or a metal compound in the pattern in the substrate material resulting from the etching process.

11. The method of claim 10 wherein the metal is selected from the group consisting of gold, palladium, nickel, copper, cobalt, platinum, iron, silver, rhodium, iridium, and combinations thereof.

12. The method of claim 10 wherein depositing nanoparticles of at least one of the metal or the metal compound in the pattern in the substrate material resulting from the etching process comprises contacting the substrate material with a solution including a salt of the metal or a metal oxide, electrodeposition, chemical reduction, or vapor deposition.

13. The method of claim 10 wherein the metal compound is an oxide, a chloride, or a hydroxide.

14. The method of claim 10 wherein the substrate material comprises graphene and the pattern in the graphene resulting from the etching process comprises holes through the graphene to form holey graphene, the method further comprising depositing nanoparticles of the metal or the metal compound in the holes of the holey graphene.

15. The method of claim 14 wherein the metal is selected from the group consisting of gold, palladium, nickel, copper, cobalt, platinum, iron, silver, rhodium, iridium, and combinations thereof.

16. The method of claim 14 wherein depositing nanoparticles of at least one of the metal or the metal compound in the pattern in the substrate material resulting from the etching process comprises contacting the holey graphene with a solution including a salt of the metal or a metal oxide, electrodeposition, chemical reduction, or vapor deposition.

17. The method of claim 14 wherein the metal compound is an oxide, a chloride, or a hydroxide.

18. The method of claim 14 wherein a plurality metals or metal compounds are deposited in the pattern in the substrate material resulting from the etching process.

19. The method of claim 1 wherein the covalent organic framework polymer is COF-5, COF-1, CTF-1, TpPa-1, TPE-Ph COF, HPB COF, ZnPc-PPE COF, or HHTP-DPB COF.

20. The method of claim 1 wherein an average pore size of the covalent organic framework polymer is in the range of 0.7 mu to 4.7 nm.

21. The method of claim 20 wherein an average neck width of the covalent organic framework polymer is no greater than 5 nm.

22. A composition comprising a graphitic substrate material comprising an etched pattern formed by the process of:
    depositing a layer of a covalent organic framework polymer comprising nanoscale pores on the graphitic substrate material as a template, the covalent organic framework polymer having an average pore size in the range of 0.7 nm to 4.7 nm and an average neck width of no greater than 5 nm, to form a templated assembly; and
    applying an etching process to the templated assembly to form the etched pattern through the layer of the covalent organic framework polymer and in the graphitic substrate material, wherein the etched pattern comprises a pattern of holes through the graphitic substrate material such that an average neck width of no greater than 5 nm is formed in the etched pattern.

* * * * *